(12) United States Patent
Ito

(10) Patent No.: US 7,969,629 B2
(45) Date of Patent: Jun. 28, 2011

(54) DATA CLASSIFYING METHOD, MULTI-DIMENSIONAL INTERPOLATION DEVICE, MULTI-DIMENSIONAL INTERPOLATION METHOD, AND COMPUTER PROGRAM

(75) Inventor: Tadayuki Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 12/505,728

(22) Filed: Jul. 20, 2009

(65) Prior Publication Data

US 2009/0279151 A1    Nov. 12, 2009

Related U.S. Application Data

(62) Division of application No. 11/281,126, filed on Nov. 17, 2005, now Pat. No. 7,692,833.

(30) Foreign Application Priority Data

Nov. 26, 2004  (JP) .................................. 2004-342262

(51) Int. Cl.
*H04N 1/46* (2006.01)
*G03F 3/08* (2006.01)
(52) U.S. Cl. ......... 358/525; 358/518; 358/523; 358/524
(58) Field of Classification Search .................. 358/1.9, 358/3.01, 3.06, 3.13, 3.21, 3.24, 3.26, 515, 358/518, 525, 532, 523, 524; 382/167, 298, 382/299, 300
See application file for complete search history.

(56) References Cited

U.S. PATENT DOCUMENTS

| | | | |
|---|---|---|---|
| 6,373,580 B1 * | 4/2002 | Walker | 358/1.1 |
| 7,365,879 B2 * | 4/2008 | Braun et al. | 358/1.9 |

* cited by examiner

*Primary Examiner* — James A Thompson
(74) *Attorney, Agent, or Firm* — Canon U.S.A. Inc., I.P. Division

(57) ABSTRACT

A data divider divides N-dimensional digital image signals into higher-order bit signals and lower-order bit signals. Reference values corresponding to all combinations of the divided higher-order bit signals are divisionally stored in $2^{N-1}$ sub-memories without overlaps. The (N+1) reference values necessary for interpolation processing are read by a reference value reader at the same time.

5 Claims, 15 Drawing Sheets

UNIT CUBE

TYPE 0

TYPE 1

TYPE 2

TYPE 3

TYPE 4

TYPE 5

COORDINATE SYSTEM

SELECT RIDGELINE IN DIRECTION OF $X_0$ AXIS

SELECT RIDGELINE IN DIRECTION OF $X_1$ AXIS

SELECT RIDGELINE IN DIRECTION OF $X_2$ AXIS

SELECT RIDGELINE IN DIRECTION OF $X_3$ AXIS

DATA CLASSIFYING METHOD, MULTI-DIMENSIONAL INTERPOLATION DEVICE, MULTI-DIMENSIONAL INTERPOLATION METHOD, AND COMPUTER PROGRAM

CROSS REFERENCE TO RELATED APPLICATIONS

This application is a Divisional of U.S. patent application Ser. No. 11/281,126, filed Nov. 17, 2005 which claims the benefit of Japanese Application No. 2004-342262 filed Nov. 26, 2004, which are hereby incorporated by reference herein in their entirety.

BACKGROUND OF THE INVENTION

1. Field of the Invention

The present invention relates to a data classifying method, a multi-dimensional interpolation device, a multi-dimensional interpolation method, and a computer program, which are particularly suitably used for executing interpolation of N-dimensional vector signals.

2. Description of the Related Art

Recently, a scanner, a video camera, etc. have been widely used as input units. Various types of color printers utilizing ink jets, dye sublimation, electrophotography, etc. have been widely used as output units. Those color input and output units have specific color spaces. Accordingly, for example, when a color image obtained with a certain scanner is directly transferred to and printed by a certain color printer, colors of a printed color image hardly match with the colors of the original color image read by the scanner.

Overcoming such a problem with color reproduction between devices handling a color image or the like requires processing (called "color space conversion") for converting a color space of the input unit to a color space of the output unit. To increase a color reproduction capability between the input unit and the output unit, each of the input unit and the output unit includes the color-space conversion function.

The term "color space conversion" practically means the whole of a series of image processing steps, such as input γ correction, luminance density conversion, masking, black generation, UCR (under color removal), output γ correction, etc., or some of those steps. In general, digital image signals of three colors (e.g., red, green and blue that are abbreviated to "RGB" hereinafter) used in the input unit are read at the same time and are converted to digital image signals of three colors (e.g., cyan, magenta and yellow that are abbreviated to "CMY" hereinafter) or four colors (e.g., cyan, magenta, yellow and black that are abbreviated to "CMYK" hereinafter) used in the output unit. Also, in the case of an electrophotographic copying machine, because a printer's engine characteristics are changed with the lapse of operation time, periodic calibration is required. In that case, conversion of four colors (e.g., "CMYK") in the input unit to four colors (e.g., "CMYK") in the output unit is also required.

A first known technique for realizing the above-mentioned color-space converting process is disclosed in U.S. Pat. No. 4,837,722. According to the first known technique, the three-dimensional cubic (tri-linear) interpolation method or the three-dimensional tetrahedron interpolation method is executed at a high speed through the steps of divisionally storing a 3D-LUT (three-dimensional lookup table), which stores the results of the color conversion, in eight memories, and reading reference values from the 3D-LUT in parallel.

With the disclosed technique, the reference values corresponding to respective apexes of a unit hypercube and used for interpolation are all stored in different memories from one another so that access conflicts will not occur when the reference values are read out of the memories. Also, the 3D-LUT is stored in eight memories while being evenly divided without overlaps (when a multi-dimensional LUT is so divisionally stored in a plurality of memories in order to read reference values from the multi-dimensional LUT in parallel, the plurality of memories will be referred to as "sub-memories" hereinafter). The description of the first known technique is limited to the three-dimensional interpolation method. However, when multi-dimensional interpolation processing is executed by using the first known technique, the processing can be executed by divisionally storing the multi-dimensional LUT in a number $2^N$ of sub-memories.

Also, there is a second known technique that executes the three-dimensional tetrahedron interpolation method at a high speed through the steps of storing a 3D-LUT in four sub-memories while dividing it without overlaps, and reading reference values in parallel (see Japanese Patent Laid-Open No. 10-307911).

With the second known technique, when executing the three-dimensional tetrahedron interpolation method, four reference values corresponding to respective apexes of a selected tetrahedron are read in parallel to increase the speed of the interpolation processing. Further, in the second known technique, the 3D-LUT is stored in four sub-memories while being evenly divided without overlaps so that access conflict will not occur when the reference values are read out of the sub-memories, as in the first known technique.

In addition, the LUT in the second known technique is divided in the multi-dimensional form. Accordingly, when the hyper-tetrahedron ((N+1)-hedron) interpolation method with N-dimensional inputs is executed, a multi-dimensional (N-dimensional) LUT can be divisionally stored in a number (N+1) of sub-memories.

Thus, the second known technique is superior to the first known technique in point of using a smaller number of sub-memories.

According to the first known technique, the multi-dimensional LUT is divided into $2^N$ by storing a number N of reference values corresponding to respective apexes of a unit hypercube in a number N of sub-memories. Therefore, the first known technique is advantageous in that it can also be realized by using other methods (e.g., the three-dimensional cubic (tri-linear) interpolation method and the three-dimensional triangular-prism (prism) interpolation method) other than the multi-dimensional tetrahedron interpolation method.

However, when the first known technique is practiced on the premise of using the multi-dimensional tetrahedron interpolation method, a number $2^N$ of memory peripheral circuits, such as memory interfaces, are required to read a number (N+1) of reference values necessary for the interpolation processing from the sub-memories in parallel. Consequently, redundant circuits are increased.

According to the second known technique, the processing is limited only to the multi-dimensional tetrahedron interpolation method, and the multi-dimensional (N-dimensional) LUT is divisionally stored in a minimum number (N+1) of sub-memories. Hence, the second known technique is advantageous in that memory peripheral circuits are also constituted in an optimum scale.

However, when N is not a value of (second power−1), the number of sub-memories is not a value of second power. For example, when N is 4, the number of sub-memories is 5. Then, when the second known technique is practiced in the form of hardware, the processing cannot be handled in binary mode. For that reason, in the case of N being not a value of (second power−1), a divider is required to generate addresses for accessing the sub-memories because the addresses cannot be generated with only shift operation and bit masking. In addition, memories are generally manufactured as products having a word number of second power. Therefore, when the sub-memories are constituted using marketed memories, the second known technique necessitates the use of memories each having a redundant word number.

SUMMARY OF THE INVENTION

In view of the problems described above, the present invention realizes high-speed interpolation processing, such as color space conversion, with ease while using a circuit scale as small as possible.

Also, when interpolation processing is executed with an N-dimensional hyper-tetrahedron ((N+1)-hedron), the present invention enables a number (N+1) of reference values necessary for the interpolation processing to be read in parallel, and reduces the number of memories for storing the reference values to be smaller than $2^N$.

The present invention provides a data classifying method for classifying apexes of each unit hypercube on N-dimensional orthogonal coordinates where N is an integer of not smaller than 4. The method includes an inputting step of inputting coordinate values of the apexes, each coordinate value being made up of N components; a selecting step of selecting a predetermined number M of components from among the N components input in the inputting step, where M is an integer smaller than N; a computing step of computing, based on values of respective predetermined bit positions of (N−M) components having not been selected in the selecting step, an index value corresponding to a result obtained by adding a multiple of (M+1) to the remainder resulting from dividing a total sum of the M components having been selected in the selecting step by (M+1); and a classifying step of classifying the apexes in accordance with the index value computed in the computing step.

Also, the present invention provides a multi-dimensional interpolation device for outputting scalar signals from input N-dimensional vector signals where N is an integer of not smaller than 4. The device includes a dividing unit adapted to divide each component of the input N-dimensional vector signals into higher-order bits and lower-order bits; a memory unit adapted to store reference values corresponding to combinations of data of the higher-order bits divided by the dividing unit, the memory unit divisionally storing the reference values in $2^{N-1}$ sub-memories; a reading unit adapted to read the reference values; and an interpolation processing unit adapted to execute interpolation processing for the input N-dimensional vector signals based on the reference values read by the reading unit and data of the lower-order bits divided by the dividing unit.

Further, the present invention provides a multi-dimensional interpolation method for outputting scalar signals from input N-dimensional vector signals where N is an integer of not smaller than 4. The method includes a dividing step of dividing each component of the input N-dimensional vector signals into higher-order bits and lower-order bits; a reading step of reading reference values corresponding to combinations of data of the higher-order bits divided in the dividing step, the reference values being divisionally stored in $2^{N-1}$ sub-memories; and an executing step of executing interpolation processing for the input N-dimensional vector signals based on the reference values read in the reading step and data of the lower-order bits divided in the dividing step.

Still further, the present invention provides a computer program having computer-executable instructions for causing a computer to perform a process for outputting scalar signals from input N-dimensional vector signals where N is an integer of not smaller than 4. The process includes a dividing step of dividing each component of the input N-dimensional vector signals into higher-order bits and lower-order bits; a reading step of reading reference values corresponding to combinations of data of the higher-order bits divided in the dividing step, the reference values being divisionally stored in $2^{N-1}$ sub-memories; and an executing step of executing interpolation processing for the input N-dimensional vector signals based on the reference values read in the reading step and data of the lower-order bits divided in the dividing step.

Further features of the present invention will become apparent from the following description of exemplary embodiments with reference to the attached drawings.

DESCRIPTION OF THE EMBODIMENTS

In embodiments of the present invention described below, a process for realizing color space conversion is practiced by previously storing the results obtained from the color space conversion, as a lookup table (LUT), in a memory. Then, the color space conversion is executed on input digital image signals by using the stored LUT, and the converted results are output.

In the process for executing the color space conversion using the LUT, interpolation processing is used in a combined manner to cut memories necessary for the LUT. The color space conversion for digital image signals given as a three-color input is performed with three-dimensional interpolation processing. Also, the color space conversion for digital image signals given as a four-color input is performed with four-dimensional interpolation processing.

A description is first made of the color space conversion process executed on digital image signals, given as a three-color input, with the combined use of the three-dimensional lookup table (3D-LUT) and the three-dimensional interpolation processing.

Input digital image signals (R, G, B) are each separated into higher-order bits and lower-order bits. The higher-order bits are used when a plurality of reference values necessary for the interpolation processing executed using the 3D-LUT are taken out. The lower-order bits are used as weight coefficients g in the interpolation processing. Then, interpolation values are computed by summation of products of the weight coefficients g and the reference values taken out of 3D-LUT.

Figure 13:
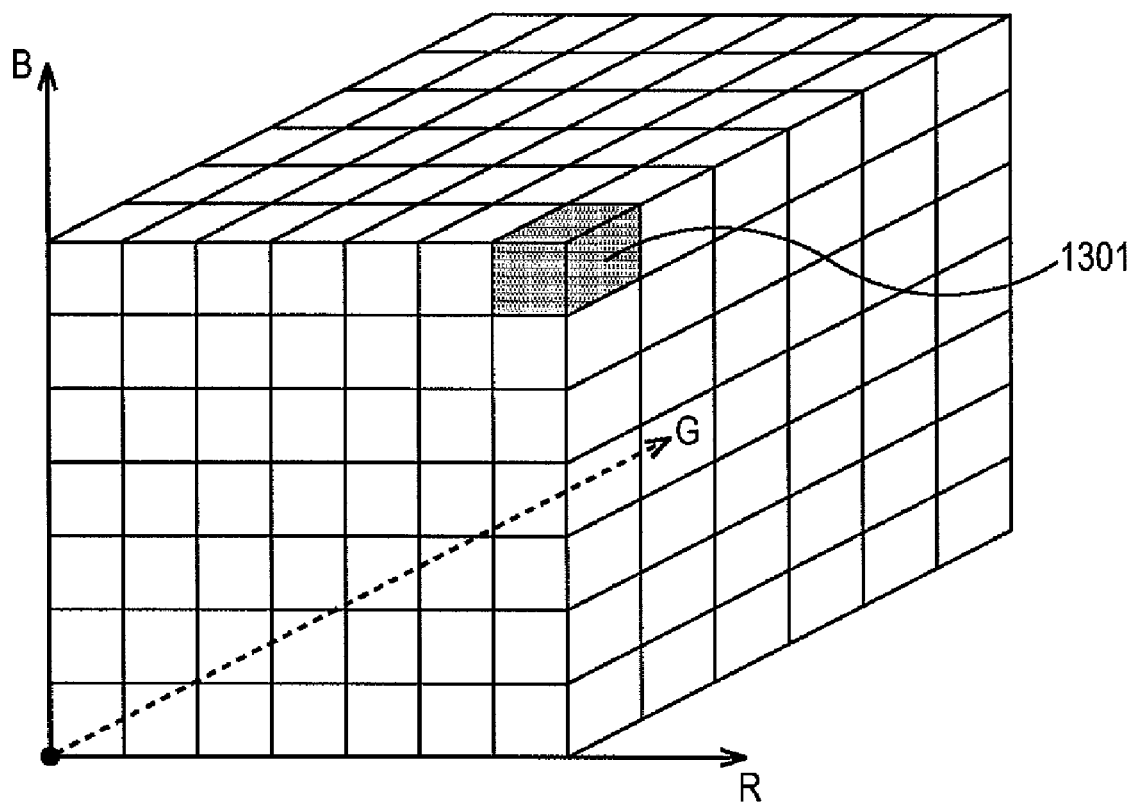
FIG. 13 illustrates a state where a color space (RGB space) given as three-dimensional inputs is divided into unit cubes according to the embodiment of the present invention.

FIG. 13 illustrates a state where a color space (RGB space) given as three-dimensional inputs is divided into unit cubes by dividing the color space in a finite number in the direction of each axis. Color data at respective apexes of the unit cubes after being subjected to the color space conversion are stored as the reference value in the 3D-LUT. By regarding the higher-order bits of the three digital image signals as coordinates of the color space, a unit cube (e.g., a unit cube 1301 shown in FIG. 13) to be used in the interpolation processing is selected and the reference values corresponding to respective apexes of the selected unit cube are used in the interpolation processing.

One example of three-dimensional interpolation processing used in that case is a tetrahedron interpolation method.

Figure 14A:
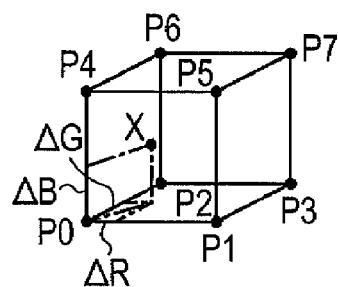
FIGS. 14A-14G illustrate the case where three-dimensional interpolation processing is executed using a 3D-LUT according to the embodiment of the present invention.
Figure 14B:
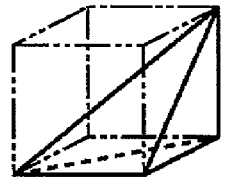
Figure 14C:
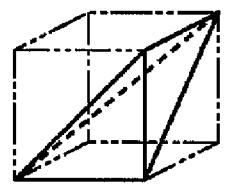
Figure 14D:
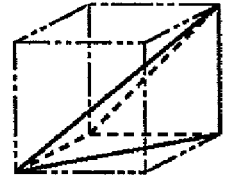
Figure 14E:
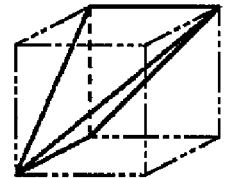
Figure 14F:
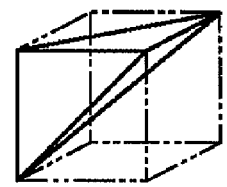
Figure 14G:
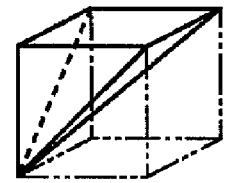

The tetrahedron interpolation method is executed through the steps of dividing a unit cube (e.g., a unit cube 1301 shown in FIG. 13) into six tetrahedrons (these six divided tetrahedrons will be referred to as "Type 0-Type 5 hereinafter), as shown in FIGS. 14B-14G, and executing the interpolation processing by using one of the following formulae (1)-(6) depending on which one of the tetrahedrons the input coordinates belong. Note that, in the following formulae (1)-(6), reference values corresponding to respective apexes of the unit cube, shown in FIG. 14A, are assumed to be P0-P7 and the weight coefficients g are assumed to be ΔR, ΔG and ΔB, respectively. Also, which one of the tetrahedrons Type 0-Type 5 is to be selected is decided depending on the relationship in magnitudes among the weight coefficients ΔR, ΔG and ΔB.

In the case of Type 0 (ΔR>ΔG>ΔB):

$$X = P0 + (P1-P0) \times \Delta R + (P3-P0) \times \Delta G + (P7-P0) \times \Delta B \quad (1)$$

In the case of Type 1 (ΔR>ΔB>ΔG):

$$X = P0 + (P1-P0) \times \Delta R + (P7-P0) \times \Delta G + (P5-P0) \times \Delta B \quad (2)$$

In the case of Type 2 (ΔG>ΔR>ΔB):

$$X = P0 + (P3-P0) \times \Delta R + (P2-P0) \times \Delta G + (P7-P0) \times \Delta B \quad (3)$$

In the case of Type 3 (ΔG>ΔB>ΔR):

$$X = P0 + (P7-P0) \times \Delta R + (P2-P0) \times \Delta G + (P6-P0) \times \Delta B \quad (4)$$

In the case of Type 4 (ΔB>ΔR>ΔG):

$$X = P0 + (P5-P0) \times \Delta R + (P7-P0) \times \Delta G + (P4-P0) \times \Delta B \quad (5)$$

In the case of Type 5 (ΔB>ΔG>ΔR):

$$X = P0 + (P7-P0) \times \Delta R + (P6-P0) \times \Delta G + (P4-P0) \times \Delta B \quad (6)$$

Further, the three-dimensional tetrahedron interpolation method described above can be expanded into multi-dimensions. The multi-dimensional hyper-tetrahedron interpolation method will be described below.

When a space fixed to the three-dimensional orthogonal coordinates shown in FIG. 13 is expanded into a multi-dimensional space fixed to N-dimensional orthogonal coordinates, the unit cube shown in FIG. 13 is expanded to a multi-dimensional unit hypercube (also called an N-dimensional hypercube or a hyper-hexahedron). Then, with the expansion into the multi-dimensional space, the tetrahedron used in the three-dimensional tetrahedron interpolation method is converted to an (N+1)-hedron that is called a hyper-tetrahedron.

The hyper-tetrahedron is formed by a line connecting a base point and a diagonal point of the unit hypercube, and a number N of ridgelines of the hypercube, which are interconnected in orthogonal relation to one another. Then, a number N! of hyper-tetrahedrons can be formed by dividing one hypercube. The number N of ridgelines selected in the process of cutting out the hyper-tetrahedrons from the hypercube are perpendicular to one another and are parallel to the directions of respective axes of the N-dimensional orthogonal coordinates. Therefore, a value resulting from adding the linear sum of output shift amounts in the directions of the respective axes to an output value of the base point is provided as an output of the multi-dimensional interpolation processing. Thus, the interpolation processing can be executed by multiplying a differential value between the reference values at opposite end points of the selected ridgeline by the distance from the base point to each ridgeline, and cumulatively adding the multiplied values to the reference value at the base point.

A manner of selecting ridgelines in the four-dimensional hyper-tetrahedron interpolation method will be described below, taking a four-dimensional space $(X_0, X_1, X_2, X_3)$ as an example. FIGS. 15A-15E illustrate a manner of selecting ridgelines in the case where input coordinates are given by $(X_0<i>+\Delta X_0, X_1<j>+\Delta X_1, X_2<k>+\Delta X_2, X_3<l>+\Delta X_3)$ and the magnitudes of differences $(\Delta X_0, \Delta X_1, \Delta X_2, \Delta X_3)$ between the input coordinates and base point coordinates $(X_0<i>, X_1<j>, X_2<k>, X_3<l>)$ have a relationship of $\{\Delta X_0 > \Delta X_1 > \Delta X_2 > \Delta X_3\}$.

Figure 15A:
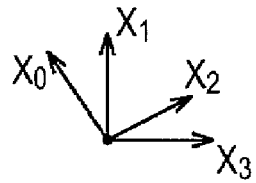
FIGS. 15A-15E illustrate a manner of selecting ridgelines in the four-dimensional hyper-tetrahedron interpolation method according to the embodiment of the present invention.
Figure 15B:
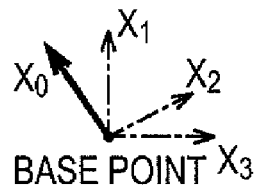
Figure 15C:
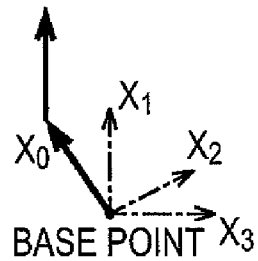

As shown in FIG. 15B, a ridgeline first selected is one parallel to an $X_0$ axis corresponding to $\Delta X_0$, which has a maximum shift amount between the input coordinates and the base point coordinates, and having one end point at the base point, i.e., a ridgeline having opposite end points given by a point $(X_0<i>, X_1<j>, X_2<k>, X_3<l>)$ and a point $(X_0<i+1>,$ $X_1<j>$, $X_2<k>$, $X_3<l>$). As shown in FIG. 15C, a ridgeline next selected is one parallel to an $X_1$ axis corresponding to $\Delta X_1$, which has a second maximum shift amount between the input coordinates and the base point coordinates, and having one end point given by the point ($X_0<i+1>$, $X_1<j>$, $X_2<k>$, $X_3<l>$), i.e., a ridgeline having opposite end points given by the point ($X_0<i+1>$, $X_1<j>$, $X_2<k>$, $X_3<l>$) and a point ($X_0<i+1>$, $X_1<j+1>$, $X_2<k>$, $X_3<l>$).

Figure 15D:
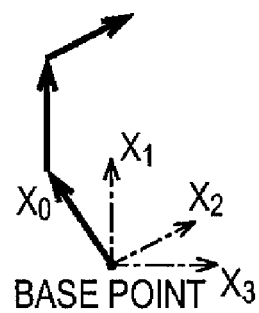

As shown in FIG. 15D, a ridgeline next selected is one parallel to an $X_2$ axis corresponding to $\Delta X_2$, which has a third maximum shift amount between the input coordinates and the base point coordinates, and having one end point given by the point ($X_0<i+1>$, $X_1<j+1>$, $X_2<k>$, $X_3<l>$), i.e., a ridgeline having opposite end points given by the point ($X_0<i+1>$, $X_1<j+1>$, $X_2<k>$, $X_3<l>$) and a point ($X_0<i+1>$, $X_1<j+1>$, $X_2<k+1>$, $X_3<l>$).

Figure 15E:
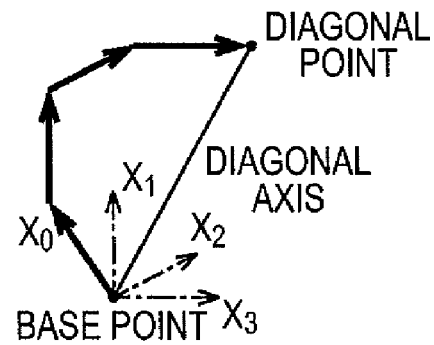

As shown in FIG. 15E, a ridgeline next selected is one parallel to an $X_3$ axis corresponding to $\Delta X_3$, which has a minimum shift amount between the input coordinates and the base point coordinates, and having one end point given by the point ($X_0<i+1>$, $X_1<j+1>$, $X_2<k+1>$, $X_3<l>$), i.e., a ridgeline having opposite end points given by the point ($X_0<i+1>$, $X_1<j+1>$, $X_2<k+1>$, $X_3<l>$) and a point ($X_0<i+1>$, $X_1<j+1>$, $X_2<k+1>$, $X_3<l+1>$).

Finally, a hyper-tetrahedron (pentahedron) defined by five points, i.e., the points ($X_0<i>$, $X_1<j>$, $X_2<k>$, $X_3<l>$), ($X_0<i+1>$, $X_1<j>$, $X_2<k>$, $X_3<l>$), ($X_0<i+1>$, $X_1<j+1>$, $X_2<k>$, $X_3<l>$), ($X_0<i+1>$, $X_1<j+1>$, $X_2<k+1>$, $X_3<l>$), and ($X_0<i+1>$, $X_1<j+1>$, $X_2<k+1>$, $X_3<l+1>$). It is here assumed that the farthest point ($X_0<i+1>$, $X_1<j+1>$, $X_2<k+1>$, $X_3<l+1>$) from the base point ($X_0<i>$, $X_1<j>$, $X_2<k>$, $X_3<l>$) is called a diagonal point, and the line connecting the base point and the diagonal point is called a diagonal axis.

The multi-dimensional hyper-tetrahedron interpolation method has the feature that the base point and the diagonal point are always selected as the apexes of the hyper-tetrahedron regardless of the relationship in magnitudes of the differences ($\Delta X_0$, $\Delta X_1$, $\Delta X_2$, $\Delta X_3$) between the input coordinates and the base point coordinates. From this point of view, assuming the base point to be a start, the diagonal point to be a goal, and the ridgelines to be routes from the start to the goal, the process of selecting the hyper-tetrahedron corresponding to the input coordinates from the unit hypercube can be regarded as a route selection problem for asking selection of a route from the base point to the diagonal point.

In this case, it is understood that the "number of options" for the possible routes is 24 ($=4!=4\times3\times2\times1$) and, in the four-dimensional interpolation processing, the unit hypercube can be divided into 24 hyper-tetrahedrons. Similarly, in the N-dimensional interpolation processing, the unit hypercube can be divided into a number N! of hyper-tetrahedrons.

The N-dimensional interpolation processing will be described below. A reference value of coordinates ($X_0<i>$, $X_1<j>$, $X_2<k>$, ..., $X_{N-2}<a>$, $X_{N-1}<b>$) in a space ($X_0$, $X_1$, ..., $X_{N-1}$) fixed to the N-dimensional orthogonal coordinates is assumed to be P<i, j, k, ..., a, b>. Also, it is assumed that the coordinates of a base point of a hypercube selected depending on certain input coordinates are ($X_0<i>$, $X_1<j>$, $X_2<k>$, ..., $X_{N-2}<a>$, $X_{N-1}<b>$) and the difference between the input coordinates and the base point coordinates is ($\Delta X_0$, $\Delta X_1$, $\Delta X_2$, ..., $\Delta X_{N-2}$, $\Delta X_{N-1}$). Then, when the relationship of $\{\Delta X_0 > \Delta X_1 > \Delta X_2 > \ldots > \Delta X_{N-2} > \Delta X_{N-1}\}$ is satisfied, an interpolation value X can be obtained using the following formula (7)

$$\begin{aligned}
X = {} & P\langle i, j, k, \ldots, a, b\rangle + \\
& (P\langle i+1, j, k, \ldots, a, b\rangle - P\langle i, j, k, \ldots, a, b\rangle) \times \Delta X_0 + \\
& (P\langle i+1, j+1, k, \ldots, a, b\rangle - P\langle i+1, j, k, \ldots, a, b\rangle) \times \Delta X_1 + \\
& (P\langle i+1, j+1, k+1, \ldots, a, b\rangle - P\langle i+1, j+1, k, \ldots, a, b\rangle) \times \\
& \Delta X_2 + \ldots ++ (P\langle i+1, j+1, k+1, \ldots, a+1, b\rangle - \\
& P\langle i+1, j+1, k+1, \ldots, a, b\rangle) \times \Delta X_{N-2} + \\
& (P\langle i+1, j+1, k+1, \ldots, a+1, b+1\rangle - \\
& P\langle i+1, j+1, k+1, \ldots, a+1, b\rangle) \times \Delta X_{N-1}
\end{aligned} \quad (7)$$

First Embodiment

A first embodiment of the present invention will be described below.

Figure 1:
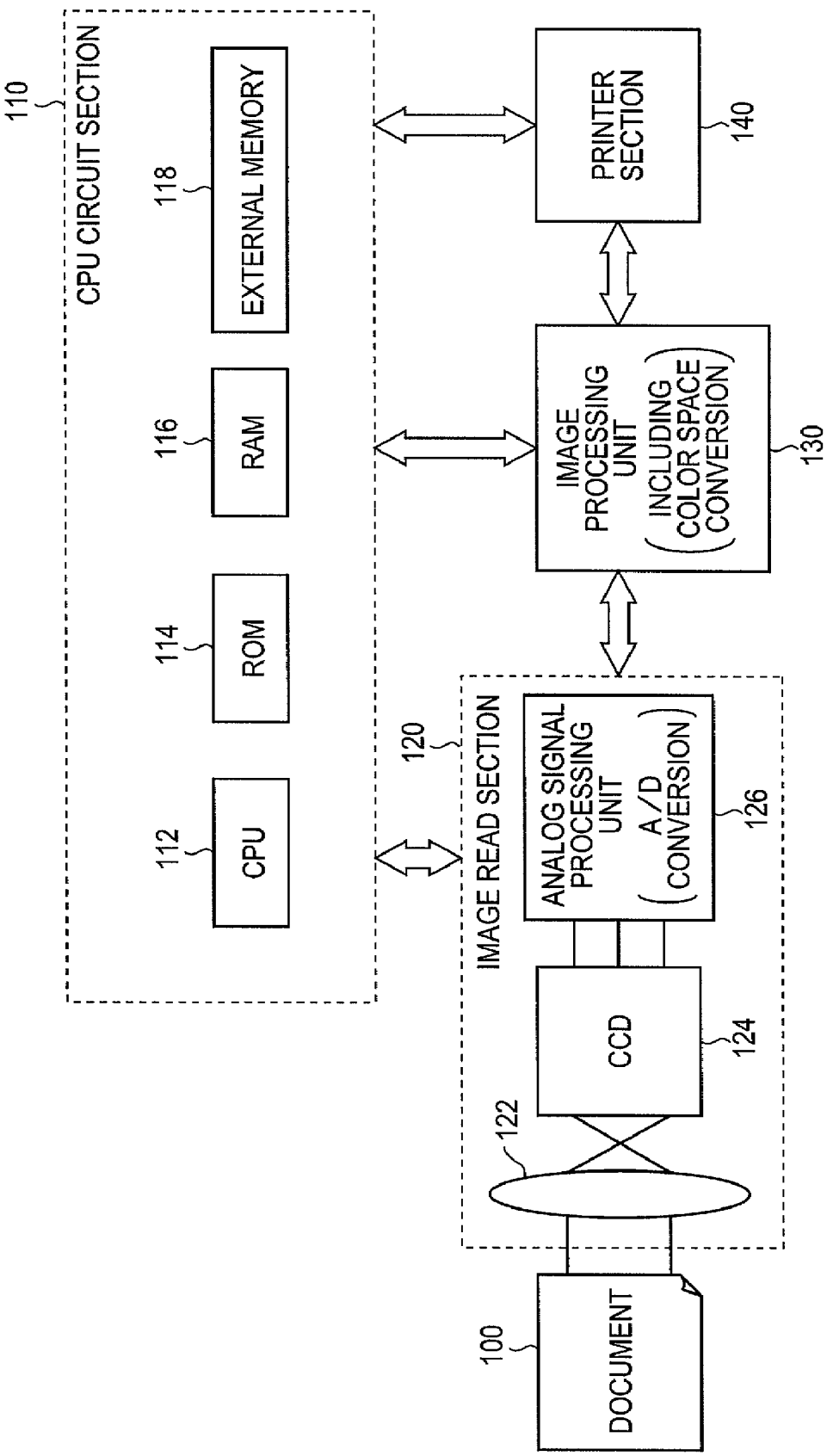
FIG. 1 is a block diagram showing one example of an overall configuration of a color copying machine according to a first embodiment of the present invention.

FIG. 1 shows one example of an overall configuration of a color copying machine.

Referring to FIG. 1, an image read section 120 includes a lens 122, a CCD (charge-coupled device) sensor 124, an analog signal processing unit 126, etc. An image of a document 100 is focused on the CCD sensor 124 through the lens 122 and is converted to analog electric signals of R (Red), G (Green) and B (Blue) by the CCD sensor 124.

Image information converted to the analog signals is input to an analog signal processing unit 126 and is subjected to correction and other processing for each of the colors R, G and B, followed by analog/digital (A/D) conversion. A digitized full-color signal (referred to as a "digital image signal" hereinafter) is input to an image processing unit 130. The image processing unit 130 executes input γ correction, color space conversion, density correction, and screening, and then outputs the digital image signal thus processed to a printer section 140.

The printer section 140 includes an exposure control unit (not shown) including, e.g., a laser, an image forming unit (not shown), a feed control unit (not shown) for transfer paper, etc. The printer section 140 records an image on the transfer paper in accordance with the input digital image signal.

A CPU circuit section 110 includes a central processing unit (CPU) 112 for executing computations and control, a read-only memory (ROM) 114 for storing fixed data and programs, a random access memory (RAM) 116 for temporarily storing data and loading programs, an external memory 118, etc. The CPU circuit section 110 controls the image read section 120, the image processing unit 130, the printer section 140, etc., to control processing sequences of the color copying machine in a supervising manner. The external memory 118 is a medium in the form of, e.g., a disk for storing parameters and programs used in the color copying machine. The data, the programs, etc. in the RAM 116 can be loaded from the external memory 118.

A multi-dimensional interpolation device of this embodiment is used, for example, to execute the color space conversion in the image processing unit 130. Note that the present invention is not limited to the color copying machine shown in FIG. 1, and, for example, it is also applicable to a printer and a PC (Personal Computer).

Figure 2:
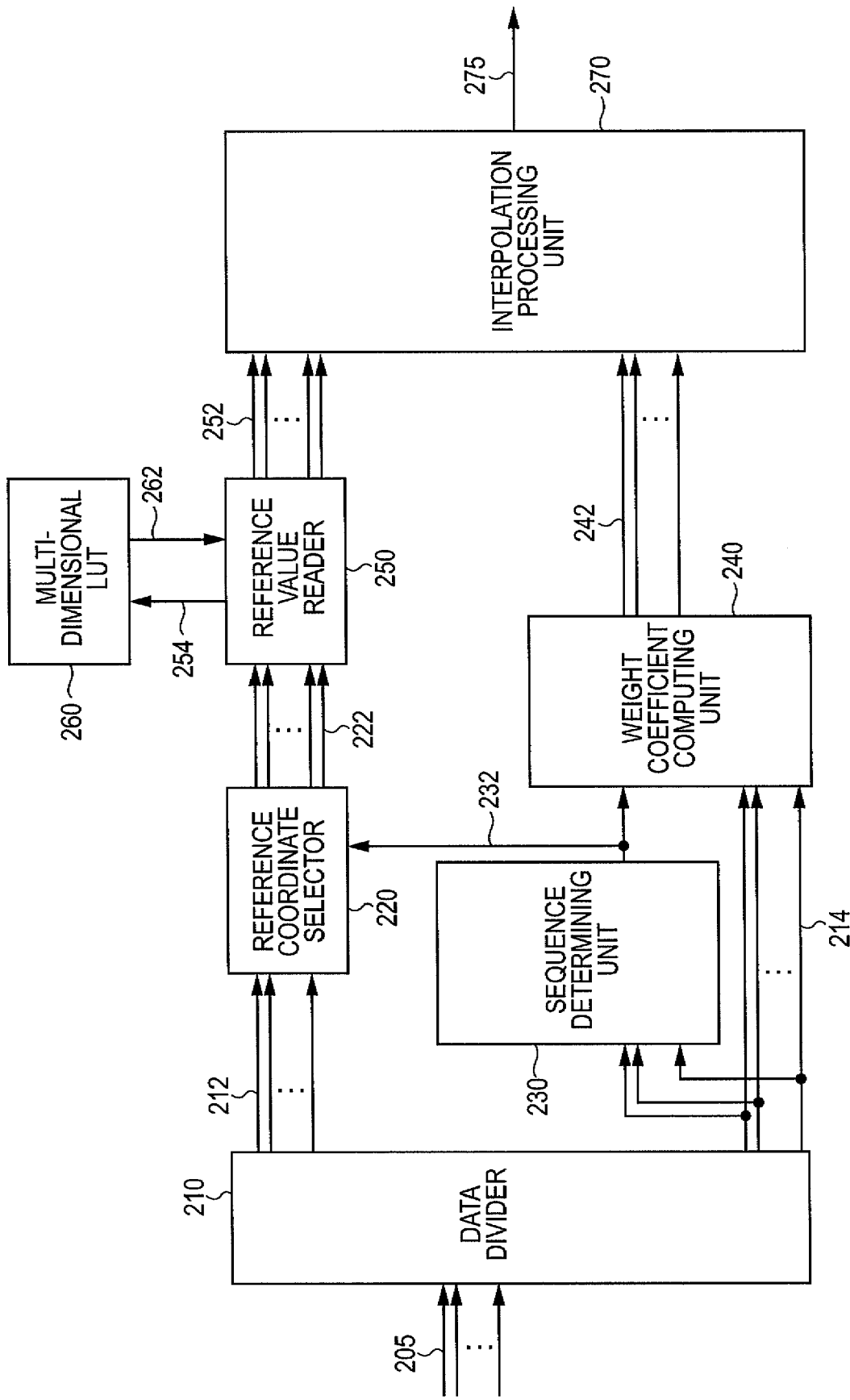
FIG. 2 is a block diagram showing one example of a circuit configuration of a multi-dimensional interpolation device according to the first embodiment of the present invention.

A circuit configuration and a processing flow of the multi-dimensional interpolation device according to this embodiment will be described in detail below with reference to FIG. 2. In the multi-dimensional interpolation device of this embodiment, interpolation processing is executed on an N-dimensional input signal to output a new signal.

First, digital image signals 205 are input to the multi-dimensional interpolation device. The digital image signals 205 are N input signals. A data divider 210 divides the digital image signals 205 into higher-order bit signals 212 and lower-order bit signals 214.

Because the digital image signals 205 are N input signals, groups of the higher-order bit signals 212 and the lower-order bit signals 214 resulting from dividing the digital image signal 205 are each given as a number N of signals. Generally, the bit depth of the higher-order bit signals 212 is decided depending on the number of unit hypercubes used in the interpolation processing. For example, when a number $(2^x-1)$ of unit hypercubes are present for a certain axis of an N-dimensional space, the bit depth of the higher-order bit signals 212 corresponding to that axis is given as x bits. Also, the lower-order bit signals 214 are generally represented by the remaining bit depth obtained by subtracting the bit depth of the higher-order bit signals 212 from the bit depth of the digital image signals 205.

A sequence determining unit 230 receives the number N of lower-order bit signals 214, determines the relationship in magnitudes among the lower-order bit signals 214, and outputs the determination result as a sequence signal 232. The sequence signal 232 is a signal indicating one of a number N! of ridgeline selection patterns which have been previously decided in the above-mentioned step of selecting the ridgelines of the hyper-tetrahedron ((N+1)-hedron) used in the interpolation processing from the unit hypercube.

In accordance with the sequence signal 232, i.e., the determination result of the sequence determining unit 230, a reference coordinate selector 220 decides coordinates for reading, out of a multi-dimensional LUT 260, a number (N+1) of reference values 252 necessary for the interpolation processing, and then outputs the decided coordinates as a number (N+1) of reference coordinate signals 222.

In parallel, a weight coefficient computing unit 240 computes weight coefficient signals 242 used in the interpolation processing based on the lower-order bit signals 214, and then outputs the computed signals 242 to an interpolation processing unit 270. One example of a method for computing the weight coefficient signals 242 used in the interpolation processing based on the lower-order bit signals 214 is as follows. The lower-order bit signals 214 are converted to the weight coefficient signals 242 used in the interpolation processing through the steps of storing a table, i.e., a table representing correspondence between both the signals, in a ROM beforehand and reading, out of the ROM, the corresponding weight coefficient signals 242 used in the interpolation processing. As another example, a method of computing the weight coefficient signals 242 based on a pre-defined calculation formula is also usable.

A reference value reader 250 reads the (N+1) reference signals from the multi-dimensional LUT 260 by using the (N+1) reference coordinate signals 222, and then outputs the read-out reference values as reference value signals 252. The multi-dimensional LUT 260 is made up of a plurality of sub-memories. The reference value reader 250 outputs address signals 254 in the same number as the number of sub-memories to the respective sub-memories in one-to-one relation for access to each sub-memory, and receives a data signal 262 from each sub-memory. The interpolation processing unit 270 receives the (N+1) reference value signals 252 and the N weight coefficient signals 242 used in the interpolation processing, and executes the interpolation processing based on the above-described interpolation processing formula, and outputs one output signal 275.

Figure 3:
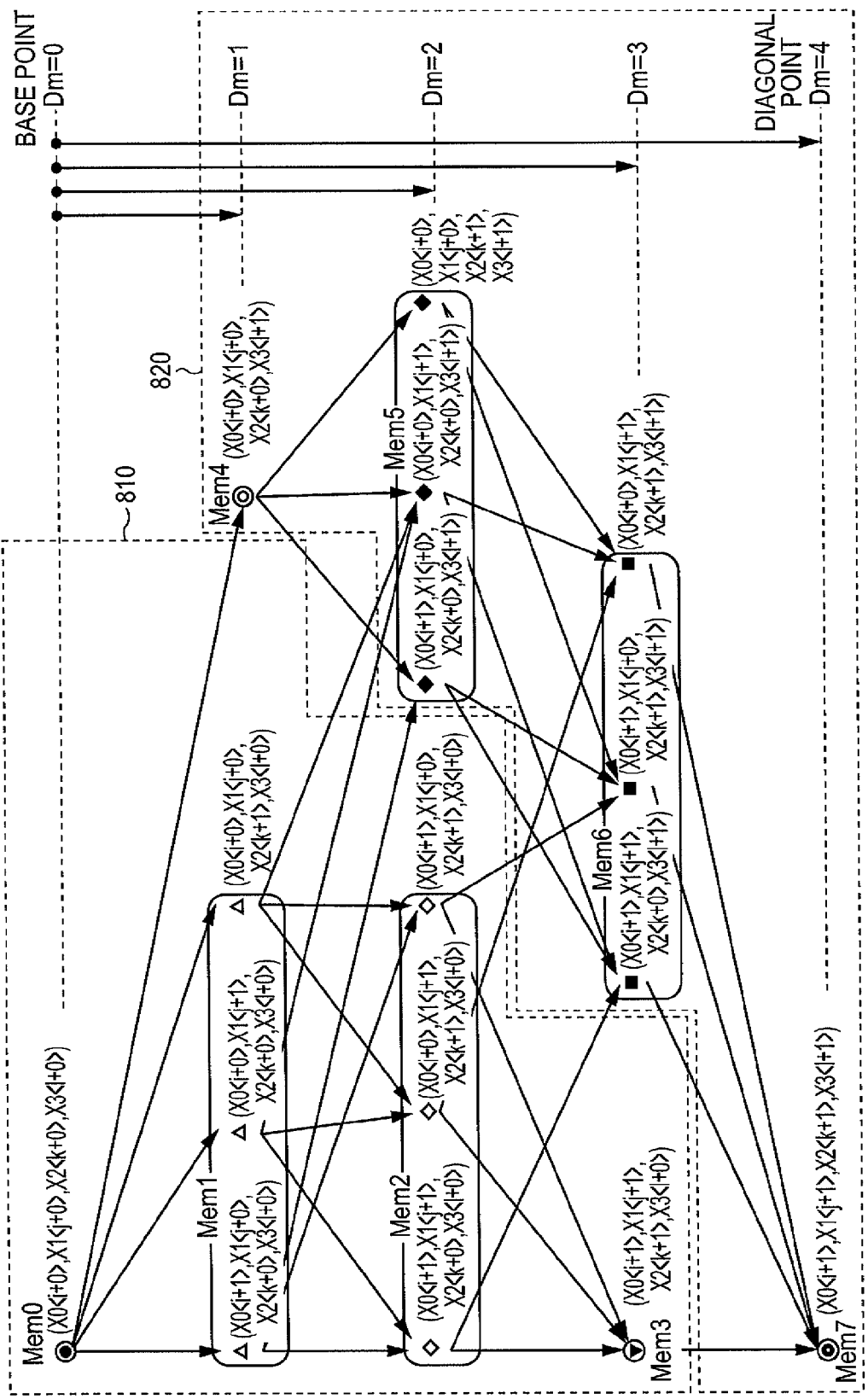
FIG. 3 is a chart showing results of classifying respective apexes of a unit cube ranging from a base point to a diagonal point based on the four-dimensional Manhattan distance according to the first embodiment of the present invention.

A description is now made of, in the N-dimensional hyper-tetrahedron interpolation method, one example of a manner of dividing and storing the reference values read out of the multi-dimensional LUT 260 in a number $(2^{N-1})$ of sub-memories. FIG. 3 shows the results of classifying respective apexes of a unit cube ranging from a base point to a diagonal point based on the four-dimensional Manhattan distance in accordance with the four-dimensional hyper-tetrahedron interpolation method.

The term "N-dimensional Manhattan distance Dm" means a distance between two points, i.e., a point A ($X_0\langle i_1\rangle$, $X_1\langle j_1\rangle$, $X_2\langle k_1\rangle$, ..., $X_{N-2}\langle a_1\rangle$, $X_{N-1}\langle b_1\rangle$) and a point B ($X_0\langle i_2\rangle$, $X_1\langle j_2\rangle$, $X_2\langle k_2\rangle$, ..., $X_{N-2}\langle a_2\rangle$, $X_{N-1}\langle b_2\rangle$), in a space fixed to N-dimensional orthogonal coordinates, and the distance Dm is defined by the following formula (8):

$$Dm = |X_0\langle i_1\rangle - X_0\langle i_2\rangle| + |X_1\langle j_1\rangle - X_1\langle j_2\rangle| + |X_2\langle k_1\rangle - X_2\langle k_2\rangle| + \tag{8}$$
$$\ldots + |X_{N-2}\langle a_1\rangle - X_{N-2}\langle a_2\rangle| + |X_{N-1}\langle b_1\rangle - X_{N-1}\langle b_2\rangle|$$

By utilizing the fact that the multi-dimensional LUT is divided and stored in $2^2$ sub-memories in the three-dimensional tetrahedron interpolation method, the manner of dividing and storing the multi-dimensional LUT in the three-dimensional tetrahedron interpolation method is applied to $2^3$ apexes existing between a base point ($X_0\langle i\rangle$, $X_1\langle j\rangle$, $X_2\langle k\rangle$, $X_3\langle l\rangle$) of a four-dimensional unit hypercube and a point ($X_0\langle i+1\rangle$, $X_1\langle j+1\rangle$, $X_2\langle k+1\rangle$, $X_3\langle l\rangle$) (see an area 810 in FIG. 3).

Because a step of selecting a hyper-tetrahedron used in the interpolation processing from the unit hypercube can be regarded as a route selection problem of finding a route until reaching the diagonal point from the base point via which ones of the apexes, only one apex is always selected from a set of apexes having the same Manhattan distance Dm. In other words, when the set of apexes having the same Manhattan distance Dm is stored in the same sub-memory, two different apexes are never read out of that sub-memory at the same time. Therefore, accesses to the sub-memory are prevented from conflicting with each other.

From FIG. 3, it can be understood that sets of apexes surrounded by thick lines, which are denoted by Mem0, Mem1, Mem2 and Mem3, are each stored in the same sub-memory, and the apexes are divided and stored in four sub-memories in the three-dimensional hyper-tetrahedron interpolation method.

Further, the manner of dividing and storing the multi-dimensional LUT in the three-dimensional tetrahedron interpolation method is applied to the remaining $2^3$ apexes ($X_0\langle i\rangle$, $X_1\langle j\rangle$, $X_2\langle k\rangle$, $X_3\langle l+1\rangle$) through ($X_0\langle i+1\rangle$, $X_1\langle j+1\rangle$, $X_2\langle k+1\rangle$, $X_3\langle l+1\rangle$) (see an area 820 in FIG. 3).

Eventually, the sets of apexes surrounded by thick lines, which are denoted by Mem0, . . . , Mem7 shown in FIG. 3, are each stored in the same sub-memory, and the multi-dimensional LUT 260 is divided into $(2\times2^2)$ sub-memories. Likewise, in the N-dimensional hyper-tetrahedron interpolation method, the manner of dividing and storing the multi-dimensional LUT in the three-dimensional tetrahedron interpolation method can be applied to each set of $2^3$ apexes ($X_0<i>$, $X_1<j>$, $X_2<k>$, ...) through ($X_0<i+1>$, $X_1<j+1>$, $X_2<k+1>$, ...).

Because there are $2^{N-3}$ sets of $2^3$ apexes and one set of apexes is stored in $2^2$ sub-memories, the multi-dimensional LUT 260 is divided into $2^{N-1}$ sub-memories in total. Thus, the number of sub-memories increases in units of $2^2$ sub-memories. Hereinafter, a unit of increase in the number of sub-memories will be referred to as a "cluster ring unit", and an assembly of sub-memories in number corresponding to each unit will be referred to as a "cluster sub-memory". Also, the number of $2^{N-3}$ sets will be referred to as a "cluster number". Further, the number of input dimensions to which one cluster sub-memory is applied will be referred to as a "base m" (e.g., "m=3" in the case of the first embodiment).

The reference value reader 250 and the multi-dimensional LUT 260 will be described in detail below with reference to FIG. 4.

Figure 4:
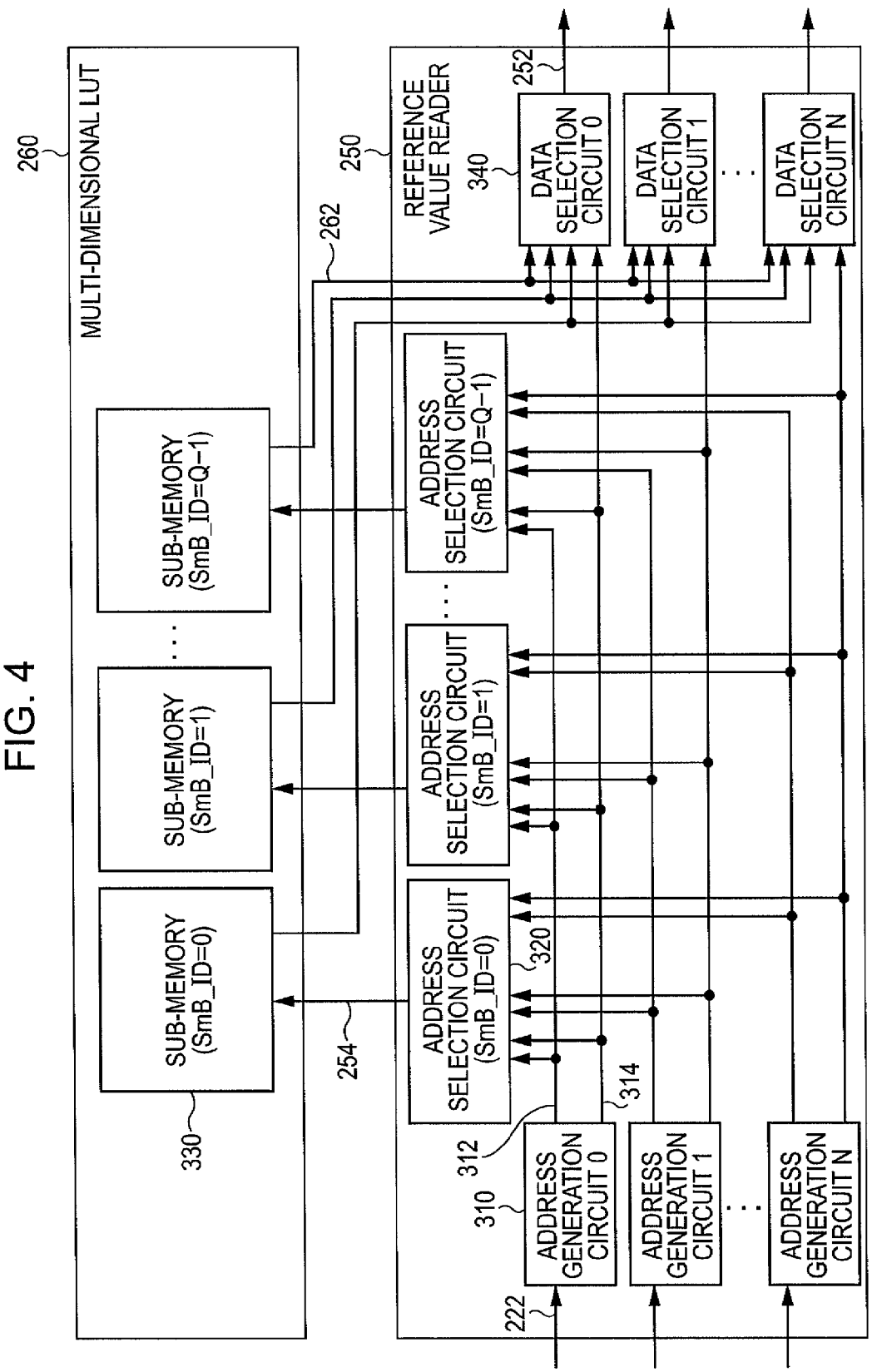
FIG. 4 is a block diagram showing one example of a circuit configuration of a reference value reader and a multi-dimensional LUT according to the first embodiment of the present invention.

In FIG. 4, (N+1) address generation circuits 310 receive respectively the (N+1) reference coordinate signals 222 and then compute address signals 312 and sub-memory bank selection signals 314. The reference value reader 250 includes address selection circuits 320 corresponding to the sub-memories in one-to-one relation. The address selection circuits 320 receive (N+1) sets of address signals 312 and the sub-memory bank selection signals 314.

Each address selection circuit 320 selects one address signal 254 from among the (N+1) address signals 312, for which a sub-memory bank ID "SmB_ID" assigned to the circuit 320 and the sub-memory bank selection signals 314 input thereto are equal to each other. Then, the address selection circuit 320 accesses a sub-memory 330 by using the selected address signal 254.

(N+1) data selection circuits 340 receive data signals 262, which are output from the sub-memories 330, in the same number as that of the sub-memories and the sub-memory bank selection signals 314 output from the corresponding address generation circuits 310. Then, each data selection circuit 340 selects only one of the data signals 262, which is output from the sub-memory 330 having a sub-memory bank ID "SmB_ID" equal to corresponding one of the sub-memory bank selection signals 314. Then, the data selection circuit 340 outputs the selected data signal 262 as the reference value 252.

Figure 5:
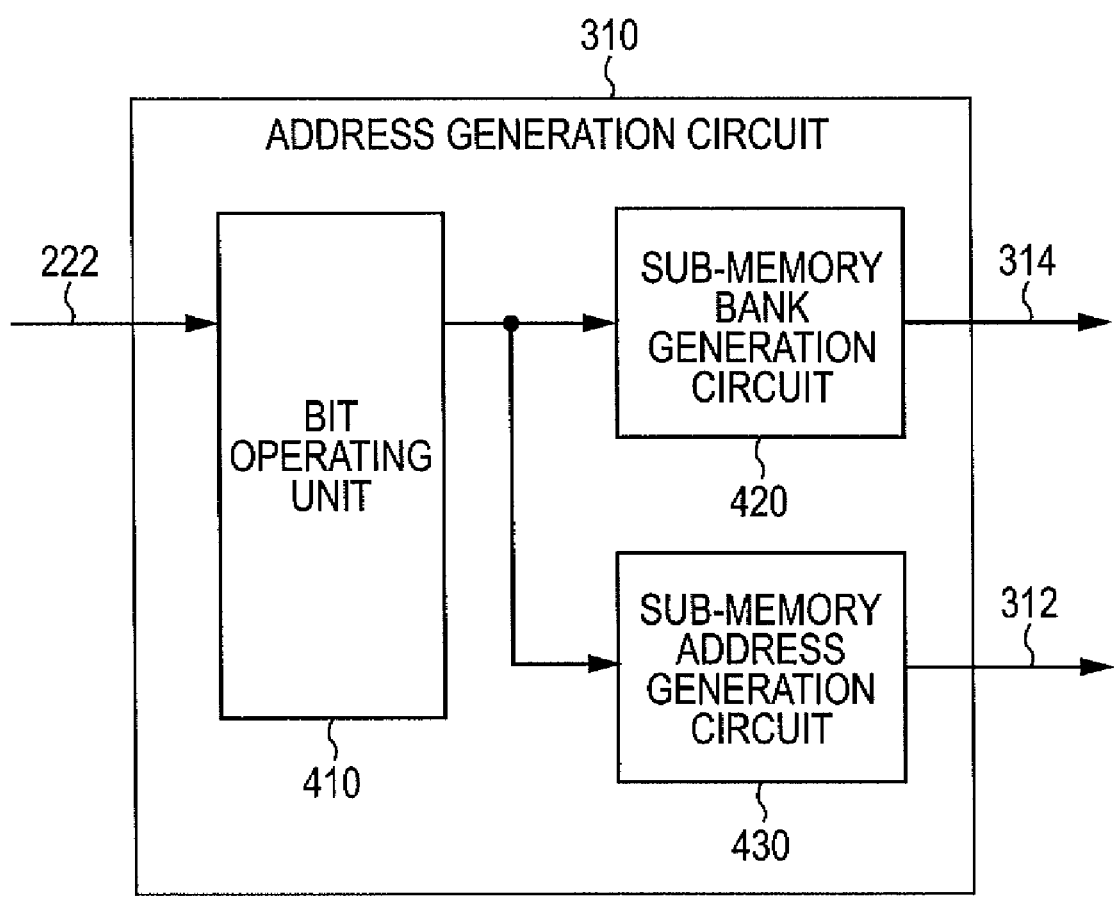
FIG. 5 is a block diagram showing one example of a configuration of an address generation circuit according to the first embodiment of the present invention.

One example of a manner of generating an address will be described below. FIG. 5 shows one example of a configuration of the address generation circuit 310.

Referring to FIG. 5, the address generation circuit 310 includes a bit operating unit 410, a sub-memory bank generation circuit 420, and a sub-memory address generation circuit 430. The following description is made on an assumption that N-dimensional reference coordinate signals 222 ($\{S_0, S_1, \ldots, S_t, \ldots, S_{N-1}\}$) are input.

Figure 6:
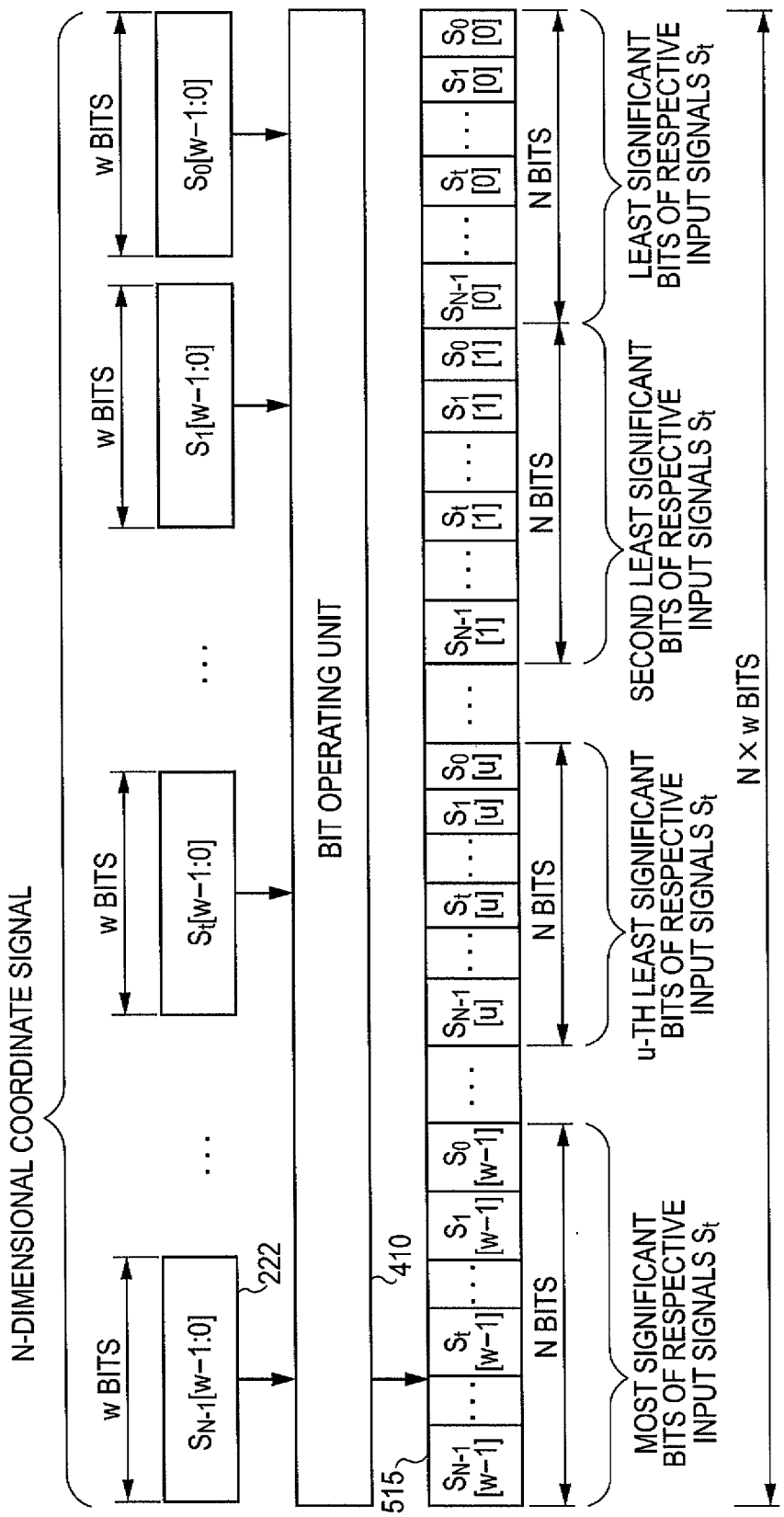
FIG. 6 is a chart for explaining one example of a manner of operating bits of an N-dimensional reference coordinate signal, which is executed by a bit operating unit, according to the first embodiment of the present invention.

FIG. 6 shows one example of a manner of operating bits of the N-dimensional reference coordinate signal 222, which is executed by the bit operating unit 410.

In FIG. 6, the bit operating unit 410 rearranges a number N of N-dimensional reference coordinate signals 222, each signal having the bit depth of w bits, into a predetermined format from the least significant bit, creating a signal 515 of (N×w) bits. In the example shown in FIG. 6, the bit operating unit 410 takes out only the least significant bits of the N reference coordinate signals 222 and creates an N-bit signal [$S_{N-1}[0], \ldots, S_t[0], \ldots, S_1[0], S_0[0]$].

Then, the bit operating unit 410 takes out only the second least significant bits of the number N of N-dimensional reference coordinate signals 222 and creates an N-bit signal [$S_{N-1}[1], \ldots, S_t[1], \ldots, S_1[1], S_0[1]$]. Further, the bit operating unit 410 takes out only the u-th least significant bits of the N reference coordinate signals 222 and creates an N-bit signal [$S_{N-1}[u], \ldots, S_t[u], \ldots, S_1[u], S_0[u]$]. In this way, the bit operating unit 410 repeats the similar operation until creating an N-bit signal [$S_{N-1}[w-1], \ldots, S_t[w-1], \ldots, S_1[w-1], S_0[w-1]$] from the most significant bits of the N reference coordinate signals 222. Finally, the bit operating unit 410 couples the respective N-bit signals with each other to create the signal 515 of (N×w) bits, as shown in FIG. 6.

By operating the bits of the number N of N-dimensional reference coordinate signals 222 as described above, it is possible to easily increase the number of unit hypercubes for the multi-dimensional LUT 260. For example, when the multi-dimensional LUT 260 is expanded in the multi-dimensional interpolation device allowing an increase in the capacity of the sub-memories 330, the expansion can be performed as follows. The bit width of the N-dimensional reference coordinate signals 222 is changed from w bits to (w+1) bits, and an N-bit signal [$S_{N-1}[w], \ldots, S_t[w], \ldots, S_1[w], S_0[w]$] is coupled to the most significant end of an output from the bit operating unit 410. Because the expanded bits are coupled to the most significant end of the address before the expansion (a manner of generating the address will be described later), the relationship between address and data is made compatible between the multi-dimensional interpolation device before the expansion and the multi-dimensional interpolation device after the expansion.

Details of the sub-memory bank generation circuit 420 will be described below with reference to FIG. 7.

Figure 7:
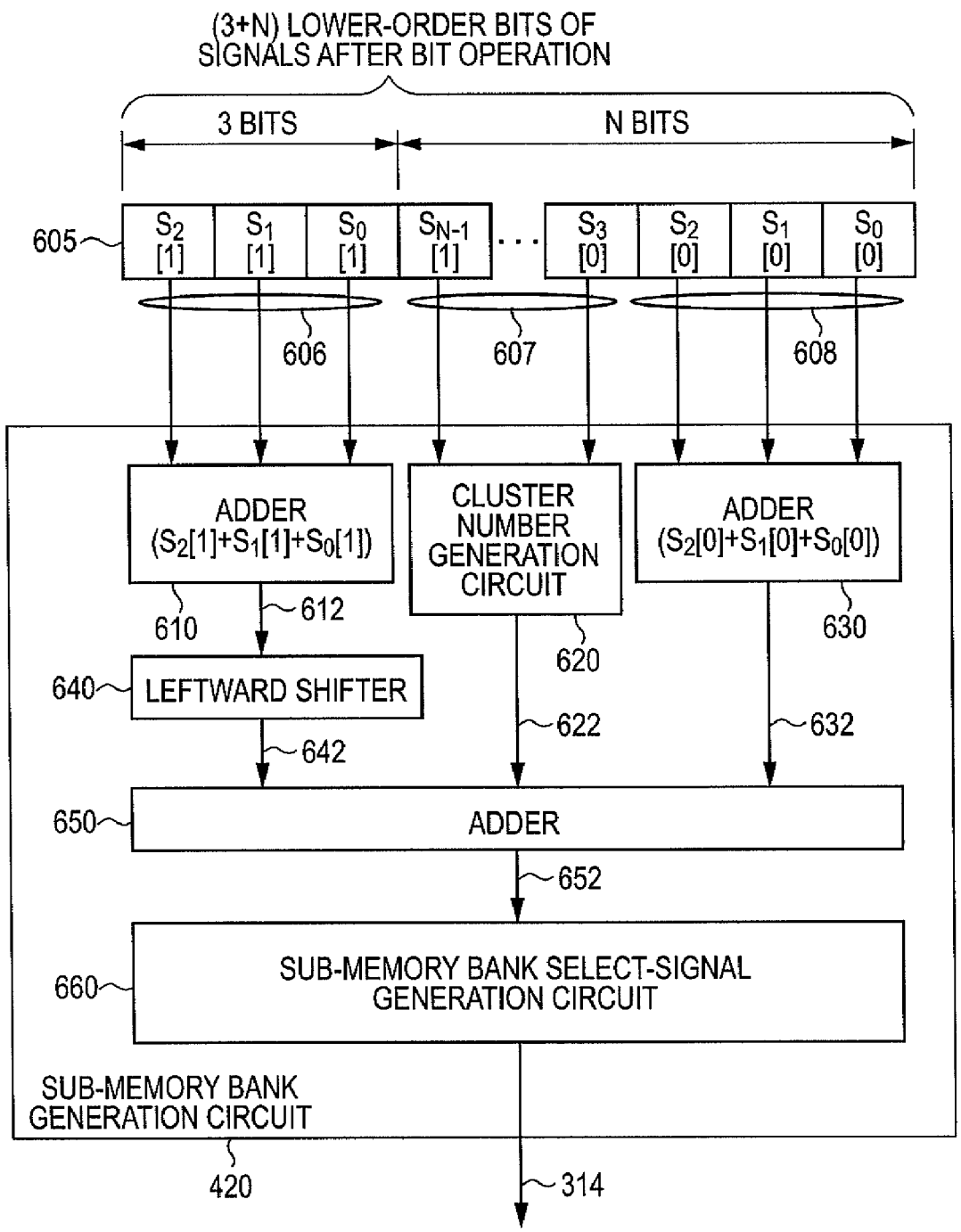
FIG. 7 is a block diagram showing one example of a configuration of a sub-memory bank generation circuit according to the first embodiment of the present invention.

In FIG. 7, a lower-order (3+N)-bit signal 605 in the (N×w)-bit signal 515 output from the bit operating unit 410 is input to the sub-memory bank generation circuit 420. Signals 608 of lower-order 3 bits in the signal 605 are summed by an adder 630. A summed value ($S_2[0]+S_1[0]+S_0[0]$) is output as a signal 632.

Similarly, signals 606 of higher-order 3 bits are summed by an adder 610. A summed value ($S_2[1]+S_1[1]+S_0[1]$) 612 is shifted leftward one bit by a leftward shifter 640 (summed value 612<<1), and the shifted value is output as a signal 642.

Also, a cluster number generation circuit 620 shifts 1 leftward by an input value 607 (1<<input value 607) and outputs the shifted value as a signal 622.

Further, the signals 622, 632 and 642 are summed by an adder 650 into a signal 652, and only lower-order (N−1) bits are taken out by a sub-memory bank select-signal generation circuit 660. The taken-out bits are output as the sub-memory bank selection signal 314.

Figure 8:
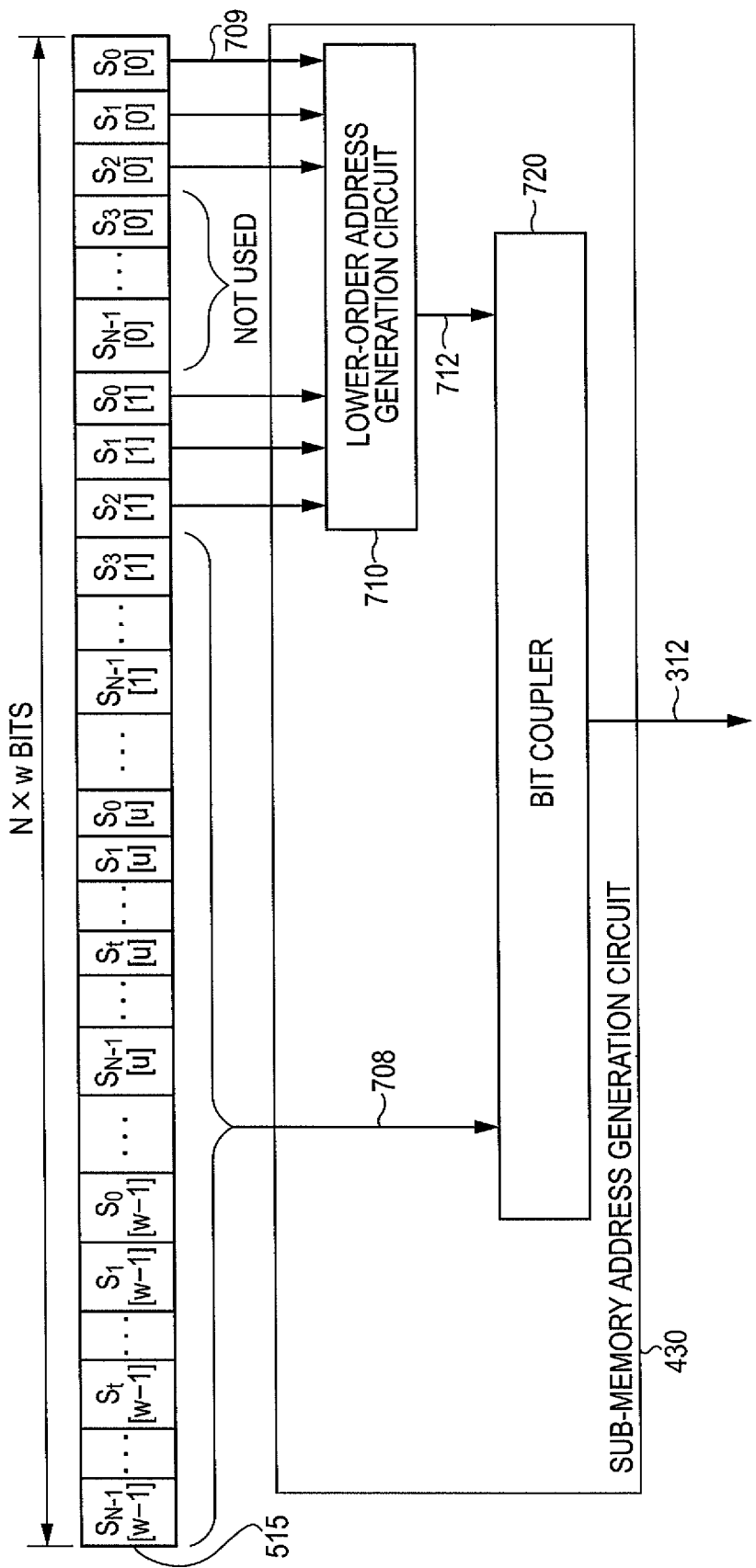
FIG. 8 is a block diagram showing one example of a configuration of a sub-memory address generation circuit according to the first embodiment of the present invention.

Details of the sub-memory address generation circuit 430 will be described below with reference to FIG. 8. Based on the (N×w)-bit signal 515 output from the bit operating unit 410, the sub-memory address generation circuit 430 generates the address signal 312 used for accessing the sub-memory 330.

Of the lower-order (3+N) bits of the (N×w)-bit signal 515 output from the bit operating unit 410, signals 709 of 6 bits are input to a lower-order address generation circuit 710 that generates a 4-bit lower-order address signal 712. The remaining bits are used to generate the sub-memory bank selection signals 314, but they are not used in the sub-memory address generation circuit 430.

Finally, a higher-order address signal 708 and the 4-bit lower-order address signal 712 are coupled with each other by a bit coupler 720, and the coupled signal is output as an address signal 312.

The lower-order address generation circuit 710 will be described in more detail below.

The signals 709 of 6 bits input to lower-order address generation circuit 710 are made up of signals representing respective lower-order 2 bits of the three-dimensional input signals {$S_0$, $S_1$, $S_2$} and correspond to the coordinates of the 3D-LUT. Since the 3D-LUT of 4×4×4 is divided into the four sub-memories 330, the signals 709 of 6 bits correspond to all the reference values stored in the four sub-memories 330.

However, the signals 709 of 6 bits cannot be used directly for the reason that the required lower-order address signal 712 is a 4-bit lower-order address signal for each of the sub-memories 330. Table 1, given below, shows the correspondence relationship per sub-memory 330 between the input signals 709 of 6 bits and to the 4-bit lower-order address signal 712 as an output.

TABLE 1

| Input | | | | |
|---|---|---|---|---|
| SmB_ID[1:0] = 0 | SmB_ID[1:0] = 1 | SmB_ID[1:0] = 2 | SmB_ID[1:0] = 3 | Output |
| 0x00 | 0x01 | 0x03 | 0x07 | 0x0 |
| 0x0b | 0x02 | 0x05 | 0x09 | 0x1 |
| 0x0d | 0x04 | 0x06 | 0x0a | 0x2 |
| 0x0e | 0x0f | 0x08 | 0x0c | 0x3 |
| 0x13 | 0x17 | 0x10 | 0x11 | 0x4 |
| 0x15 | 0x19 | 0x1b | 0x12 | 0x5 |
| 0x16 | 0x1a | 0x1d | 0x14 | 0x6 |
| 0x18 | 0x1c | 0x1e | 0x1f | 0x7 |
| 0x23 | 0x27 | 0x20 | 0x21 | 0x8 |
| 0x25 | 0x29 | 0x2b | 0x22 | 0x9 |
| 0x26 | 0x2a | 0x2d | 0x24 | 0xa |
| 0x28 | 0x2c | 0x2e | 0x2f | 0xb |
| 0x30 | 0x31 | 0x33 | 0x37 | 0xc |
| 0x3b | 0x32 | 0x35 | 0x39 | 0xd |
| 0x3d | 0x34 | 0x36 | 0x3a | 0xe |
| 0x3e | 0x3f | 0x38 | 0x3c | 0xf |

Figure 9A:
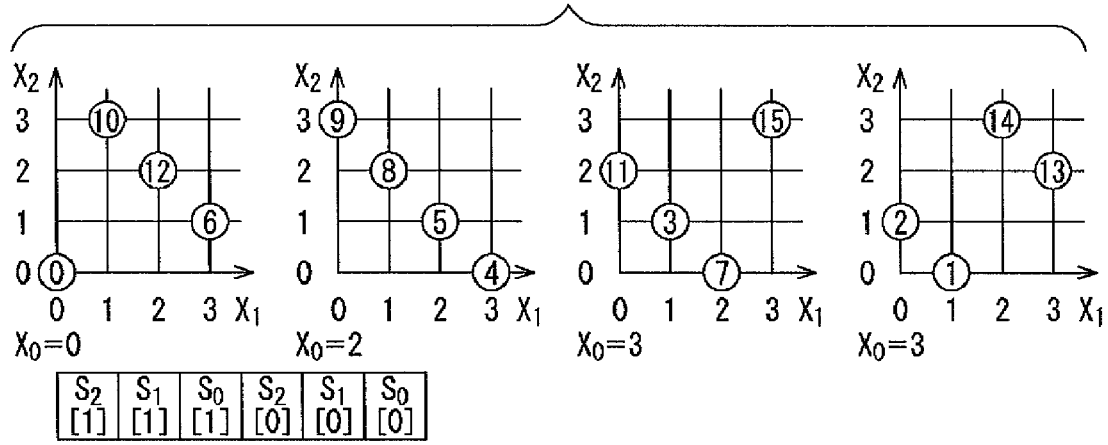
FIGS. 9A-9C illustrate positions of reference values corresponding to sub-memory bank ID's, which are marked in the increasing order of addresses, according to the first embodiment of the present invention.
Figure 9B:
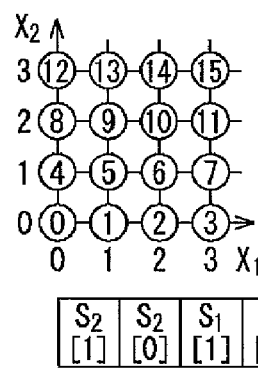
Figure 9C:
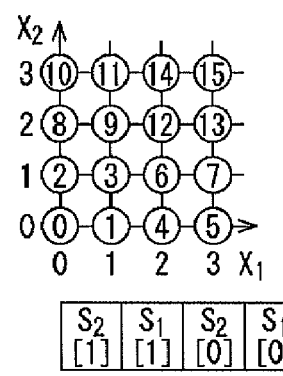

FIGS. 9A-9C illustrate positions of the reference values corresponding to the sub-memory bank ID SmB_ID=0 in the 3D-LUT of 4×4×4, which are marked in increasing order of addresses (see encircled numerals 0 through 15) in FIGS. 9A-9C). In FIG. 9A, the reference values in positions not marked mean that those reference values are stored in the other sub-memories 330.

By preparing a table as shown in Table 1 and installing the 3D-LUT of 4×4×4 as a table ROM in a circuit, the signals 709 of 6 bits can be easily converted to the 4-bit lower-order address signal 712.

Alternatively, the table ROM can be omitted by previously arranging the reference points scattered in the 3D-LUT of 4×4×4 and collecting them into (4×4) reference points as shown in FIGS. 9B and 9C. When the reference points are arranged as shown in FIG. 9B, the lower-order address signal 712 is given as a signal obtained by coupling bits in the order of [$S_2[1]$, $S_2[0]$, $S_1[1]$, $S_1[0]$]. Also, when the reference points are arranged as shown in FIG. 9C, the lower-order address signal 712 is given as a signal obtained by coupling bits in the order of [$S_2[1]$, $S_1[1]$, $S_2[0]$, $S_1[0]$].

Table 2, given below, shows the results of comparing the above-described first and second known techniques with this embodiment.

TABLE 2

| | N dimensions | | | |
|---|---|---|---|---|
| | 3 | 4 | 5 | 6 |
| Total number of reference values (16^N points) | 4,096 | 65,536 | 1,048,576 | 16,777,216 |
| | Number of sub-memories | | | |
| 1st known technique | 8 | 16 | 32 | 64 |
| 2nd known technique | 4 | 5 | 6 | 7 |
| This embodiment | NA | 8 | 16 | 32 |
| | Number of reference values per sub-memory | | | |
| 1st known technique | 512 | 4,096 | 32,768 | 262,144 |
| 2nd known technique | 1,024 | 13,108 | 174,763 | 2,396,746 |
| This embodiment | NA | 8,192 | 65,536 | 524,288 |

As seen from Table 2, this embodiment can reduce the number of sub-memories to a half of that required in the first known technique. Also, unlike the second known technique, this embodiment can make the number of reference values, which are stored in each sub-memory after division, always become a number of second power. Further, in the hyper-tetrahedron interpolation method with N-dimensional inputs (N is an integer of not smaller than 4), lower-order 4 bits of each address are always decided from three-dimensional inputs as a base. Accordingly, the circuit for generating lower-order 4 bits of each address is the same regardless of change in the value of N.

With the second known technique, because of the necessity of a divider for generating an address, some expedient, such as changing the contents of the table ROM for each value of N, has to be taken in order to reduce the scale of the address generation circuit. This means that the address generation circuit must be redesigned for each value of N. In contrast, as described above, this embodiment enables the address generation circuit to be reutilized regardless of change in the value of N, and is easily adaptable for expansion into multi-dimensions. Further, even when the bit depth of the N-dimensional input signal is increased with an increase in the number of unit hypercubes for the multi-dimensional LUT, this embodiment is easily adaptable by performing the bit operation at the time of generating the address. In other words, this embodiment can realize a multi-dimensional interpolation device that is expandable for both the number of N-dimensional input signals and the bit depth.

Thus, according to this embodiment, in the hyper-tetrahedron interpolation method with N-dimensional inputs (N is an integer of not smaller than 4), lower-order 4 bits of each address are always decided from three-dimensional inputs as a base, and the circuit for generating lower-order 4 bits of each address is the same regardless of change in the value of N. Hence, the address generation circuit can be reutilized and easier adaptation for expansion into multi-dimensions can be realized. Further, even when the bit depth of the N-dimensional input signal is increased with an increase in the number of unit hypercubes for the multi-dimensional LUT, adaptability for such an increase in the bit depth of the N-dimensional input signal can be easily realized by performing the bit operation at the time of generating the address. In other words, this embodiment can provide a multi-dimensional interpolation device that is expandable for both the number of N-dimensional input signals and the bit depth. In particular, when the multi-dimensional interpolation device according to this embodiment is applied to the four-dimensional hyper-tetrahedron (pentahedron) interpolation method, the number of the sub-memories 330 is larger than an essential number, i.e., 5, but it is a minimum number of second power ($=2^3$) larger than 5, thus resulting in a highly practical advantage.

Second Embodiment

A second embodiment of the present invention will be described below. In the first embodiment described above, the multi-dimensional LUT is divided and stored by allocating the sub-memories in units of $2^2$ (clustering unit=$2^2$) to the three-dimensional inputs as a base (i.e., base m=3). When the present invention is applied to the four-dimensional hyper-tetrahedron interpolation method, the sub-memories in the above-mentioned unit (cluster sub-memory) are required in two sets (cluster number=$2^{4-3}$). The manner of dividing and storing the multi-dimensional LUT in the sub-memories is not limited to that described in the first embodiment, and it can be generalized although the address generation circuit is more complicated. In the following description of this second embodiment, the same components as those in the first embodiment are denoted by the same symbols used in FIGS. 1 through 9, and a detailed description of those components is not repeated here.

The clustering unit is given as (m+1) for the base m that represents the number of input dimensions as a base. When applied to the N-dimensional hyper-tetrahedron interpolation method, the cluster number is given as $2^{N-m}$. A total number NSmB of sub-memories necessary for the N-dimensional hyper-tetrahedron interpolation method is expressed by the following formula (9) on condition of N>m:

$$NSmB=(m+1)\times 2^{N-m} \qquad (9)$$

Table 3, given below, shows the correspondence relationship between the base m representing the number of input dimensions as a base and the total number of sub-memories when the N-dimensional hyper-tetrahedron interpolation method is used.

TABLE 3

| Number of input dimensions base m | Unit of increase in sub-memories | Total number of N-dimensional sub-memories | | | | | | | |
|---|---|---|---|---|---|---|---|---|---|
| | | 3 | 4 | 5 | 6 | 7 | 8 | 9 | 10 |
| 2 | 3 | 6 | 12 | 24 | 48 | 96 | 192 | 384 | 768 |
| 3 | $2^2$ | NA | 8 | 16 | 32 | 64 | 128 | 256 | 512 |
| 4 | 5 | NA | NA | 10 | 20 | 40 | 80 | 160 | 320 |
| 5 | 6 | NA | NA | NA | 12 | 24 | 48 | 96 | 192 |
| 6 | 7 | NA | NA | NA | NA | 14 | 28 | 56 | 112 |
| 7 | $2^3$ | NA | NA | NA | NA | NA | 16 | 32 | 64 |
| 8 | 9 | NA | NA | NA | NA | NA | NA | 18 | 36 |
| 9 | 10 | NA | NA | NA | NA | NA | NA | NA | 20 |
| 10 | 11 | NA | NA | NA | NA | NA | NA | NA | NA |

Further, the manner of dividing and storing the multi-dimensional LUT in the sub-memories in a generalized fashion can also be practiced in the form of hardware.

Figure 10:
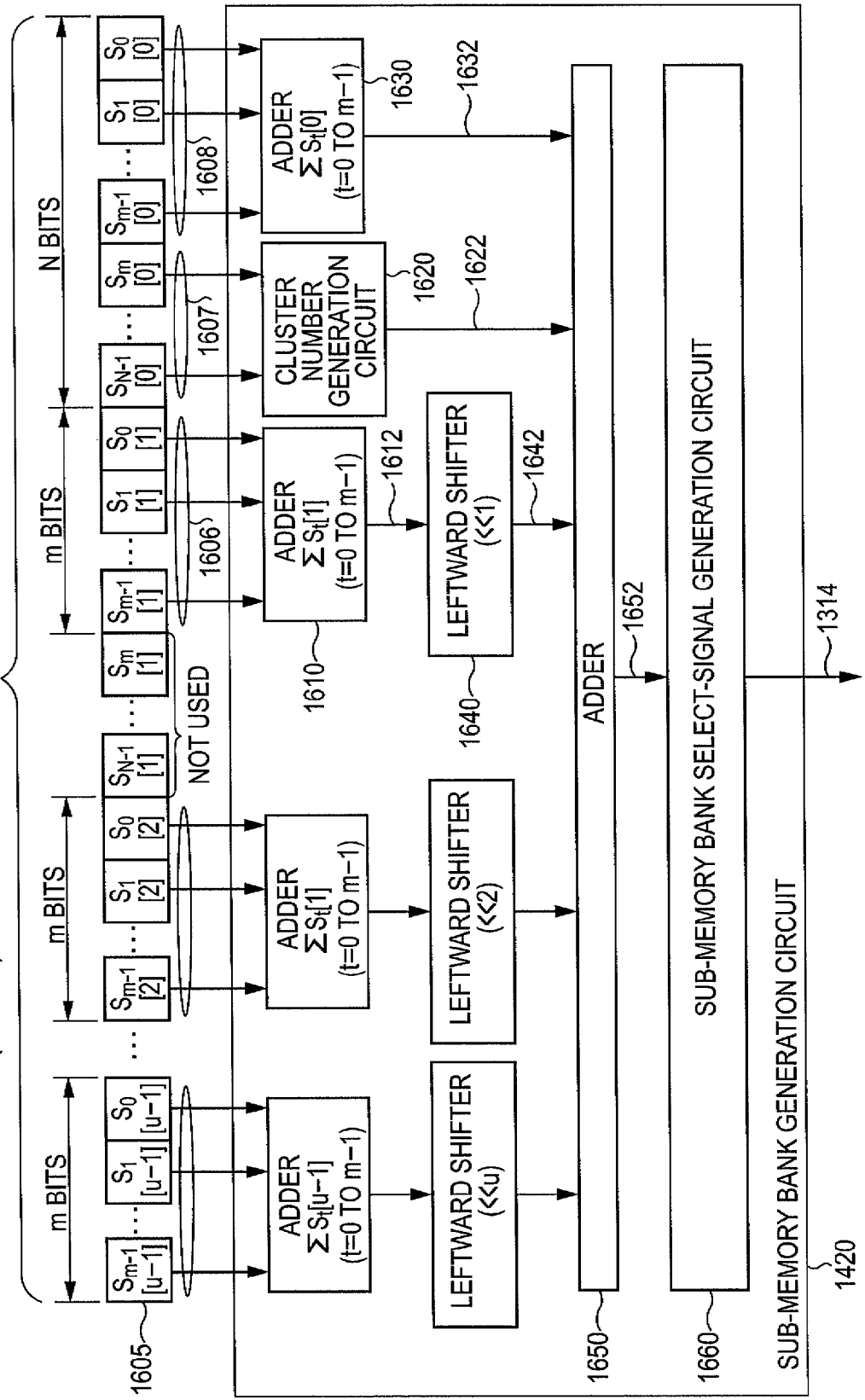
FIG. 10 is a block diagram showing one example of a configuration of a generalized sub-memory bank generation circuit according to a second embodiment of the present invention.

FIG. 10 shows a generalized sub-memory bank generation circuit 1420.

In FIG. 10, a lower-order (m+N×u)-bit signal 1605 in the (N×w)-bit signal 515 output from the bit operating unit 410 is input to the generalized sub-memory bank generation circuit 1420. Here, u represents the bit depth at which (m+1) can be expressed in binary notation. Stated another way, u is a minimum integer not smaller than $\log_2(m+1)$. Signals 1608 of lower-order m bits in the signal 1605 are summed by an adder 1630. A summed value ($S_{m-1}[0]+\ldots+S_1[0]+S_0[0]$) is output as a signal 1632.

Similarly, signals 1606 of higher-order m bits are summed by an adder 1610. A summed value ($S_{m-1}[1]+\ldots+S_1[1]+S_0[1]$) 1612 is shifted leftward one bit by a leftward shifter 1640, and the shifted value is output as a signal 1642. Then, as shown in FIG. 10, a similar operation is repeated until $((S_{m-1}[u-1]+\ldots,+S_1[u-1]+S_0[u-1])<<u)$ is obtained.

Further, the summed signal 1632 and the shifted signals 1642 are summed by an adder 1650 described later. This means that, of the input N reference coordinate signals ($S_0, S_1, \ldots, S_t, \ldots, S_{N-1}$), only lower-order u bits of each of the signals ($S_0, S_1, \ldots, S_{m-1}$) corresponding to the base m representing the number of input dimensions as a base are taken out and a total value of the taken-out bits is obtained. In the example of the sub-memory bank generation circuit 1420 shown in FIG. 10, summing and shift operations are executed because processing is made on the output of the bit operating unit 410.

Also, a cluster number generation circuit 1620 outputs, as a signal 1622, a value resulting from multiplying the clustering unit (m+1) by an integer given as an input value 1607.

Further, the signals 1632, 1622 and 1642 are summed by an adder 1650 and then output as a signal 1652. A sub-memory bank select-signal generation circuit 1660 divides the signal 1652 by $(m+1) \times 2^{N-m}$, and the resulting remainder is output as a sub-memory bank selection signal 1314.

Thus, the sub-memory bank generation circuit 1420 in this embodiment is configured as a circuit for executing computation based on the following formula (10) and generating the sub-memory bank selection signal 1314;

$$id = \left[\sum_{j=0}^{m-1} X_j\right] \% (m+1) + (m+1) \times \sum_{j=m}^{N-1} \{(X_j \% 2) \ll (j-m)\} \quad (10)$$

where << represents a leftward shift of bit, and % represents the remainder of the division (for example, a%b represents the remainder resulting from dividing a by b).

In the formula (10), the first term "ΣX_j%(m+1)" creates ID's for 0-m, and the second term "(m+1)ΣX_j%2<<(j-m)" adds offsets (m+1)*0, (m+1)*1, (m+1)*2, etc.

Figure 11:
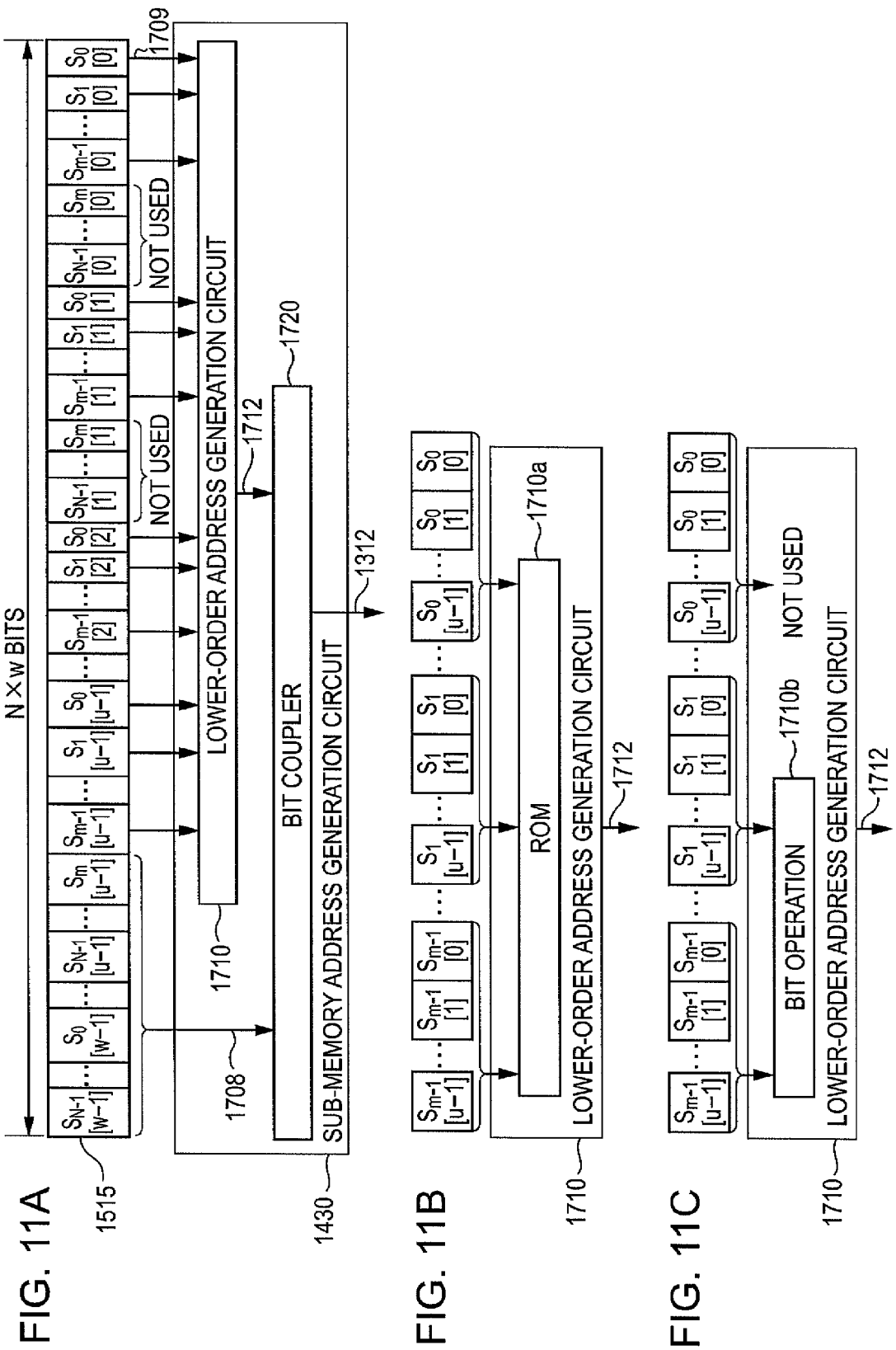
FIGS. 11A-11C are each a block diagram showing one example of a configuration of a generalized sub-memory address generation circuit according to the second embodiment of the present invention.

Referring to FIG. 10, the cluster number generation circuit 1620 determines whether (N−m) not-selected bits are each an odd or even number. The cluster number generation circuit 1620 decides, as an index value, a value obtained by adding a multiple of (M+1) to the above-mentioned remainder in accordance with the determination result, and classifies the apexes in accordance with the index value. As an integer value multiplied by the clustering unit (m+1), the second embodiment focuses attention on signals $(S_m, S_{m+1}, \ldots, S_{n-1})$ in n-dimensional input signals $(S_0, S_1, \ldots, S_{m-1}, S_m, S_{m+1}, \ldots, S_{n-1})$ and employs the least significant bits (LSBs) $(S_m[0], S_{m+1}[0], \ldots, S_{n-1}[0])$ of the focused signals. This eventually means that it is determined whether the signals $(S_m, S_{m+1}, \ldots, S_{n-1})$ are each an odd or even number. Whether an offset is added to a bank signal or not is determined in the second embodiment by using the LSBs of the focused signals, but bits used for the determination are not limited to the LSBs. More specifically, the signal 1622 can be output as a value resulting from multiplying the clustering unit (m+1) by an integer in accordance with on/off at a preset bit position of the signals $(S_m, S_{m+1}, \ldots, S_{n-1})$, such as one of the following signals, instead of the LSBs:

$(S_m[1], S_{m+1}[1], \ldots, S_{n-1}[1])$
$(S_m[2], S_{m+1}[2], \ldots, S_{n-1}[2])$
. . .
$(S_m[w-1], S_{m+1}[w-1], \ldots, S_{n-1}[w-1])$ A generalized sub-memory address generation circuit 1430 will be described below with reference to FIGS. 11A-11C.

As shown in FIG. 11A, the generalized sub-memory address generation circuit 1430 generates an address signal 1312 for access to the sub-memory 330 based on an (N×w)-bit signal 1515 output from the bit operating unit 410.

Signals 1709 of (m×u) bits in lower-order (m+N×u) bits of the (N×w)-bit signal 1515 output from the bit operating unit 410 are input to a lower-order address generation circuit 1710 that generates a lower-order address signal 1712 of {(m−1)×u} bits. The remaining bits are used to generate the sub-memory bank selection signals 1314, but they are not used in the sub-memory address generation circuit 1430.

Finally, a higher-order address signal 1708 and the {(m−1)×u}-bit lower-order address signal 1712 are coupled with each other by a bit coupler 1720, and the coupled signal is output as an address signal 1312.

The lower-order address generation circuit 1710 generates the lower-order address signal 1712 by using a table ROM 1710a, as shown in FIG. 11B. In this case, as the base m increases, the scale of the required table ROM is also increased.

To avoid such a drawback, when the base m is a value of a second power−1 (e.g., when the base m is 3 or 7 in Table 3), the lower-order address generation circuit 1710 can be configured using a circuit 1710b to execute only the bit operation, as shown in FIG. 11C. In the case of the 8-dimensional hyper-tetrahedron interpolation method, as seen from Table 3, an 8-dimensional hyper-tetrahedron interpolation device (multi-dimensional interpolation device) facilitating generation of addresses and having a smaller total number of sub-memories can be realized with the base m set to 7.

According to this embodiment, as described above, by setting the base m, which represents the number of input dimensions as a base, to (N−1) in the hyper-tetrahedron interpolation method with N-dimensional inputs (N is an integer of not smaller than 3), the clustering unit (m+1) is always N. Hence, the cluster number is given by $2^{N-m}=2^1$, and the multi-dimensional LUT can be divisionally stored in (N×2) sub-memories.

Third Embodiment

A third embodiment of the present invention will be described below. In this third embodiment, the multi-dimensional LUT 260 in the first embodiment is configured using an external memory and a cache mechanism. Also, the bit depth of reference values stored in the multi-dimensional LUT in this third embodiment is assumed to be 8 bits. In the following description of this third embodiment, the same components as those in the first and second embodiments are denoted by the same reference numbers used in FIGS. 1 through 11, and a detailed description of those components is not repeated here.

The cache mechanism used in this embodiment permits burst access to the external memory, thus realizing high-speed data update. The term "burst access" means a manner of reading data corresponding to a plurality of certain successive addresses at a time instead of reading data from the external memory one word by one word. In general, a universal memory, such as synchronous dynamic RAM (SDRAM) or double data rate RAM (DDR-SDRAM), is adapted for burst access in units of 16 bytes (128 bits). In this embodiment, therefore, it is assumed that a unit of the burst access is 16 bytes.

Accordingly, the cache mechanism accesses the external memory in unit of data of 8 bits (bit depth of the reference values)×16 words. As seen in FIG. 8, the higher-order address signal 708 becomes an address signal for access to the external memory, and the lower-order address signal 712 becomes a signal indicating a position of target data, which is located in 16 bytes of data obtained by the burst access. Hereinafter, those two kinds of signals are discriminated from each other by using the terms "higher-order address signal" and "lower-order address signal".

Figure 12:
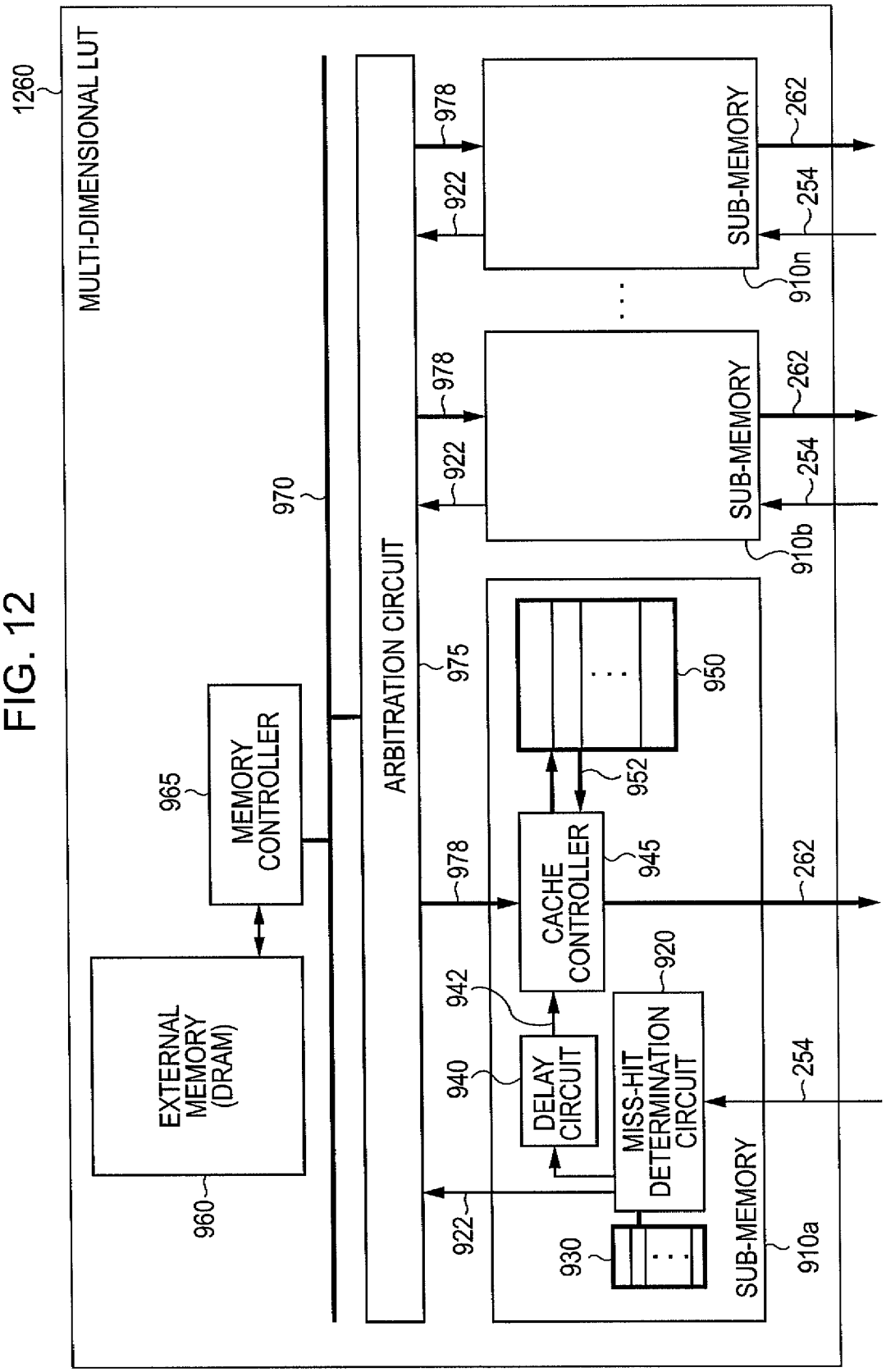
FIG. 12 is a block diagram showing one example of a configuration of a multi-dimensional LUT including a cache mechanism according to a third embodiment of the present invention.

FIG. 12 shows one example of a configuration of the multi-dimensional LUT according to this embodiment. The circuit operation of this embodiment will be described below with reference to FIG. 12.

When the address signal 254 is input, a miss-hit determination circuit 920 determines a cache hit or miss-hit based on the higher-order address signal 708 included in the address signal 254. The miss-hit determination circuit 920 stores, in a tag RAM 930, respective higher-order address values of addresses corresponding to data stored in a data buffer 950.

If the higher-order address signal 708 included in the address signal 254 input from the exterior is the same as one of the higher-order values of the addresses stored in the tag RAM 930, the miss-hit determination circuit 920 determines that a cache hit is found. On the other hand, if the higher-order address signal 708 differs from all the higher-order values of the addresses, the miss-hit determination circuit 920 determines that a cache miss-hit is resulted. When a miss-hit is determined, the miss-hit determination circuit 920 overwrites the higher-order value of the address stored at any tag number in the tag RAM 930 with the higher-order address signal 708 input from the exterior. In other words, the miss-hit determination circuit 920 replaces the data in the data buffer 950 corresponding to that tag number with data updated from the external memory 960.

To execute such a data replacing process, the miss-hit determination circuit 920 first sends, as an address signal 922, the higher-order address signal 708 included in the address signal 254 to an arbitration circuit 975. Then, the miss-hit determination circuit 920 requests data to the external memory 960 via the arbitration circuit 975, a bus 970, and a memory controller 965. The arbitration circuit 975 performs arbitration among the address signals 922 output from respective cache mechanisms connected to the sub-memories 910a-910n in one-to-one relation, and then sends the address signals 922 to memory controllers 965 in sequence.

Further, the arbitration circuit 975 returns data sent from the memory controllers 965 to the cache mechanisms connected to the sub-memories 910a-910n in the sequence at which the address signals 922 have been sent. Subsequently, the miss-hit determination circuit 920 operates as follows regardless of the result of determination on a cache hit or miss-hit. The miss-hit determination circuit 920 sends a flag indicating the determination result, the tag number of the cache, and the lower-order address signal 712 included in the address signal 254 together, as a command signal 942, to a delay circuit 940. It is to be noted that the number of the sub-memories 910 is not limited to the number shown in FIG. 12.

The delay circuit 940 is the FIFO (First-In First-Out) type and is capable of storing a certain number of command signals 942. Therefore, until an open FIFO area is filled, the miss-hit determination circuit 920 successively sends the address signals 922 to the external memory 960 in a first-in manner.

The cache controller 945 receives the command signal 942 from the delay circuit 940 and, if the determination result shows a hit, it takes out 16-byte data 952 from the data buffer 950 corresponding to the tag number. Then, 1-byte data to be output is selected in accordance with the lower-order address signal 712, and the selected data is output as a data signal 262.

If the determination result shows a miss-hit, the cache controller 945 waits until data 978 is sent from the arbitration circuit 975. At the time when the data 978 is sent, the cache controller 945 selects, from the data 978, 1-byte data to be output in accordance with the lower-order address signal 712, and outputs the selected data as the data signal 262. In parallel, the data 978 is written in the data buffer 950 in accordance with the tag number, thus updating the data buffer 950.

The higher-order address signal 708 has been subjected to the bit operation described above with reference to FIG. 6. Therefore, a cache miss-hit rate is substantially even for change in any of the N-dimensional reference coordinate signals ($S_0, S_1, \ldots, S_t, \ldots, S_{N-1}$).

Thus, according to this embodiment, in the hyper-tetrahedron interpolation device with N-dimensional inputs (N is an integer of not smaller than 4), the lower-order address signal 712 is always a 4-bit signal regardless of change in the value of N. Therefore, the necessity of changing the cache mechanism is eliminated in spite of the value of N being changed, and the same circuit can be reutilized. As a result, regardless of change in the value of N, the multi-dimensional LUT can be easily realized by using the external memory and the cache mechanism.

Other Embodiments of Present Invention

The present invention also involves the case in which program code (software) for realizing the functions of any of the above-described embodiments is supplied to a computer in an apparatus or system, which is connected to various devices such that those various devices are operated to realize the functions of any of the above-described embodiments, thus causing those various devices to be operated in accordance with programs installed in the computer (CPU or microprocessing unit (MPU)) in the apparatus or system.

In that case, the program code (software) serves to realize the functions of any of the above-described embodiments. Hence the program code itself or mechanism for supplying the program code to the computer, e.g., a storage medium storing the program code, constitutes examples of the present invention. Storage media for storing the program code can be, e.g., flexible disks, hard disks, optical disks, magneto-optical disks, compact disk-ROM (CD-ROM), magnetic tapes, non-volatile memory cards, ROM, etc.

Further, the present invention involves not only the case in which the functions of any of the above-described embodiments are realized with the computer executing the program code supplied to it, but also the case in which the program code realizes the functions of any of the above-described embodiments in cooperation with an OS (Operating System) or any other application software which is running on the computer. The program code used in those cases is also involved in the present invention.

In addition, the supplied program code can be loaded in a memory provided in a function add-on board inserted in the computer or a function add-on unit connected to the computer. Then, a CPU or the like incorporated in the function add-on board or unit can execute a part or the whole of the actual processing in accordance with commands from the program code, in order to realize the functions of any of the above-described embodiments. That case is further involved in the present invention.

As described above, according to the embodiments of the present invention, the N-dimensional digital image signals 205 are divided into the higher-order bit signals 212 and the lower-order bit signals 214. Then, reference values corresponding to all combinations of the divided higher-order bit signals are divisionally stored in the $2^{N-1}$ sub-memories 330 (i.e., the multi-dimensional LUT 260) without overlaps. In addition to thus divisionally storing the reference values, (N+1) reference values necessary for the interpolation processing are read at the same time. That arrangement enables the interpolation processing to be sped up. Also, since a divider is not required to generate the address for access to the sub-memory 330, the interpolation processing for the color space conversion, etc. can be executed at a higher speed. Those advantages can be easily realized with a circuit scale as small as possible. Further, a multi-dimensional interpolation device is provided which can eliminate the necessity of redesigning the address generation circuit and the cache mechanism when expanded into multi-dimensions, and which is highly expandable for both the number of inputs and the bit depth.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A data classifying method for an apparatus including a processor to classify apexes of each unit hypercube on N-dimensional orthogonal coordinates where N is an integer of not smaller than 4, the method comprising:
   an inputting step of inputting coordinate values of the apexes into the apparatus, each coordinate value being made up of N components;
   a selecting step of selecting a predetermined number M of components from among the N components input in the inputting step, where M is an integer smaller than N;
   a computing step, performed using the processor, of computing an index value corresponding to a result obtained by adding a multiple of (M+1) based on values of respective predetermined bit positions of (N−M) components having not been selected in the selecting step, to the remainder resulting from dividing a total sum of the M components having been selected in the selecting step by (M+1);
   a classifying step of classifying the apexes in accordance with the index value computed in the computing step; and
   an outputting step of outputting a result of the classifying step.

2. A method for an apparatus including a processor to classify apexes of each unit hypercube on N-dimensional orthogonal coordinates where N is an integer of not smaller than 4, the method comprising:
   an inputting step of inputting coordinate values of the apexes into the apparatus, each coordinate value being made up of N components;
   a selecting step of selecting a predetermined number M of components from among the N components input in the inputting step, where M is an integer smaller than N;
   a computing step, performed using the processor, of computing, an index value corresponding to a result obtained by adding a multiple of (M+1), based on whether (N−M) components having not been selected in the selecting step are each an odd or even number, to the remainder resulting from dividing a total sum of the M components having been selected in the selecting step by (M+1);
   a classifying step of classifying the apexes in accordance with the index value computed in the computing step; and
   an outputting step of outputting a result of the classifying step.

3. The method according to claim 2, wherein the computing step computes the index value of an apex having an N-dimensional orthogonal coordinate value $(X_0, X_1, \ldots, X_{M-1}, X_M, \ldots X_{N-1})$, corresponding to id expressed by the following formula:

$$id = \left[\sum_{j=0}^{M-1} X_j\right] \% (M+1) + (M+1) \times \sum_{j=M}^{N-1} \{(X_j \% 2) \ll (j-M)\}$$

where % represents the remainder of division, and j=0, 1, ..., M−1, M, ..., N−1.

4. The method according to claim 2, wherein the predetermined number M is 3 and the classifying step classifies the apexes into $2^{N-1}$ groups.

5. The method according to claim 2, wherein the predetermined number M is (N−1) and the classifying step classifies the apexes into (N×2) groups.

* * * * *